March 15, 1938. E. G. ROEHM 2,111,332
MULTIPLE AUTOMATIC PATTERN CONTROLLED MILLING MACHINE
Filed April 23, 1937 11 Sheets-Sheet 1

INVENTOR.
ERWIN G. ROEHM
BY
H. K. Parsons
ATTORNEY.

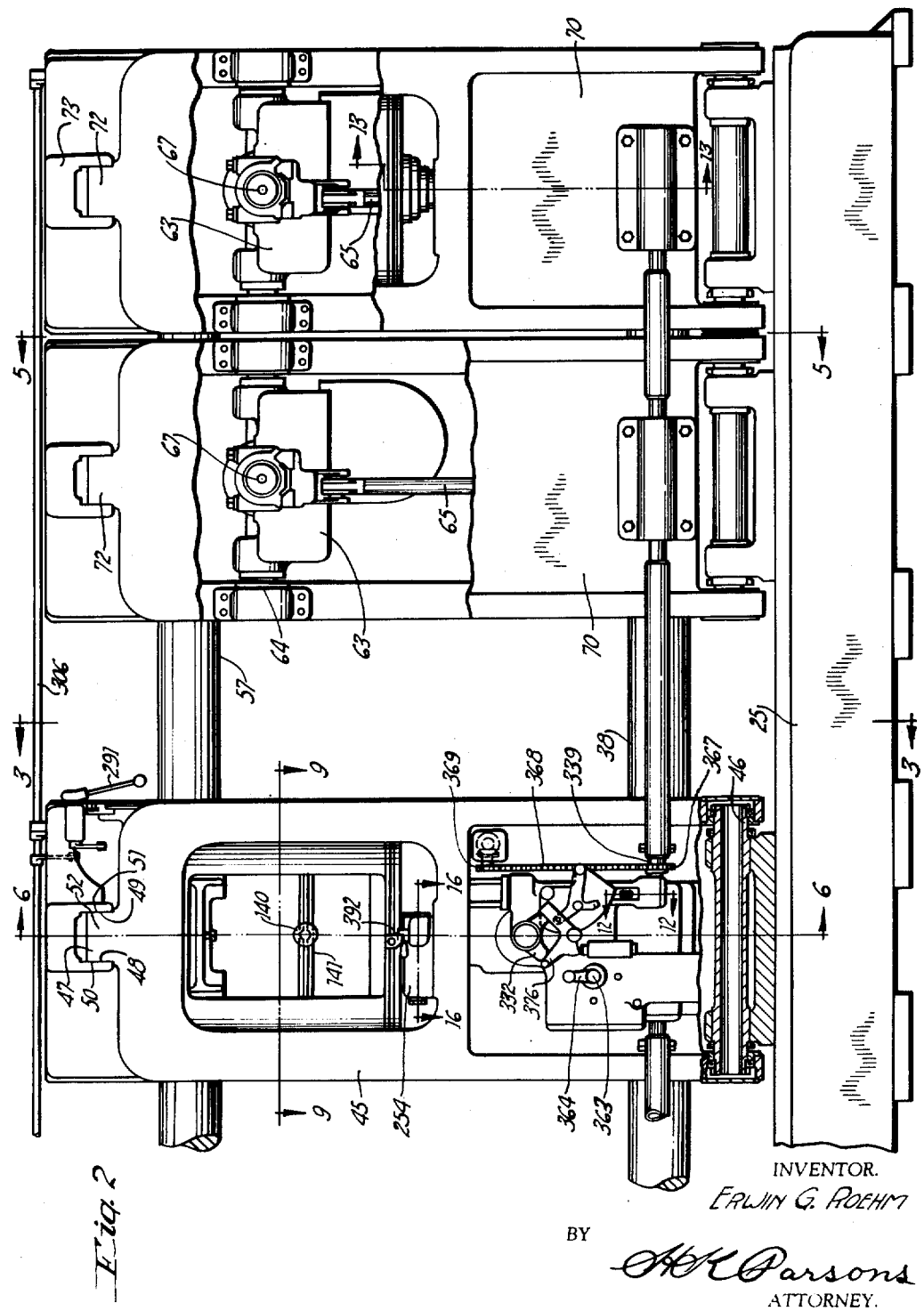

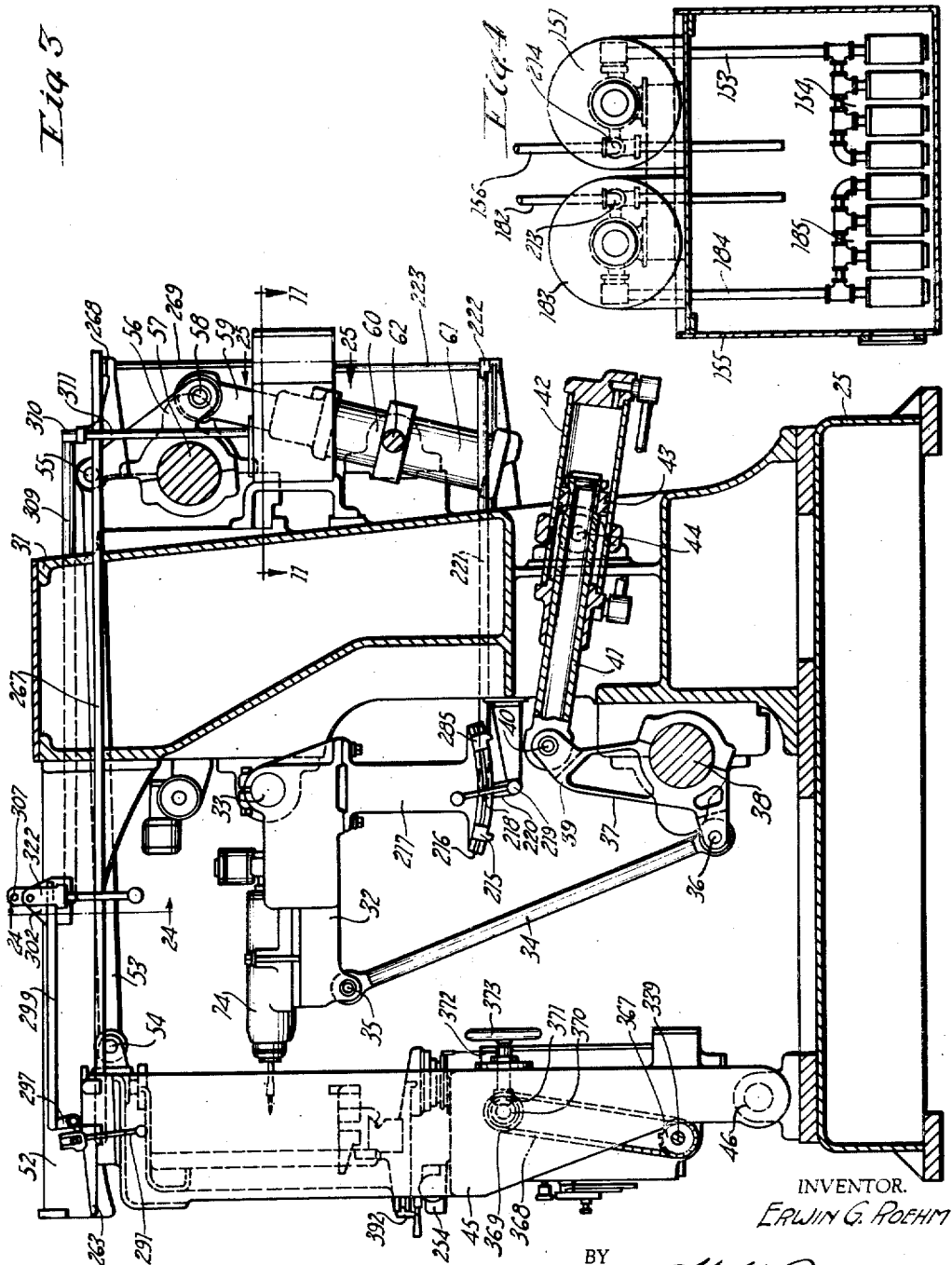

March 15, 1938.  E. G. ROEHM  2,111,332
MULTIPLE AUTOMATIC PATTERN CONTROLLED MILLING MACHINE
Filed April 23, 1937  11 Sheets-Sheet 4
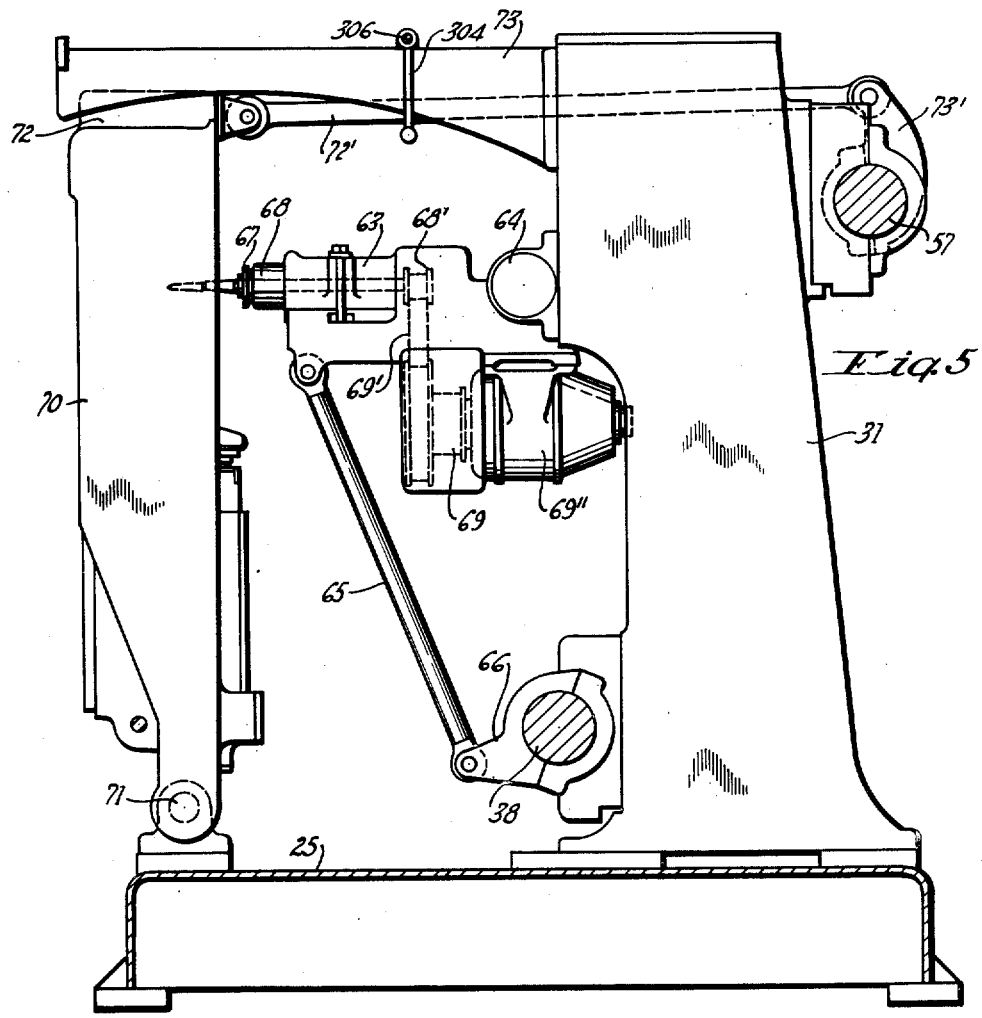
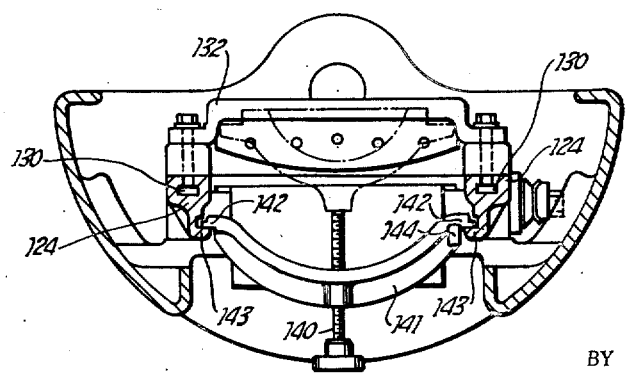
INVENTOR.
ERWIN G. ROEHM
BY
A. K. Parsons
ATTORNEY.

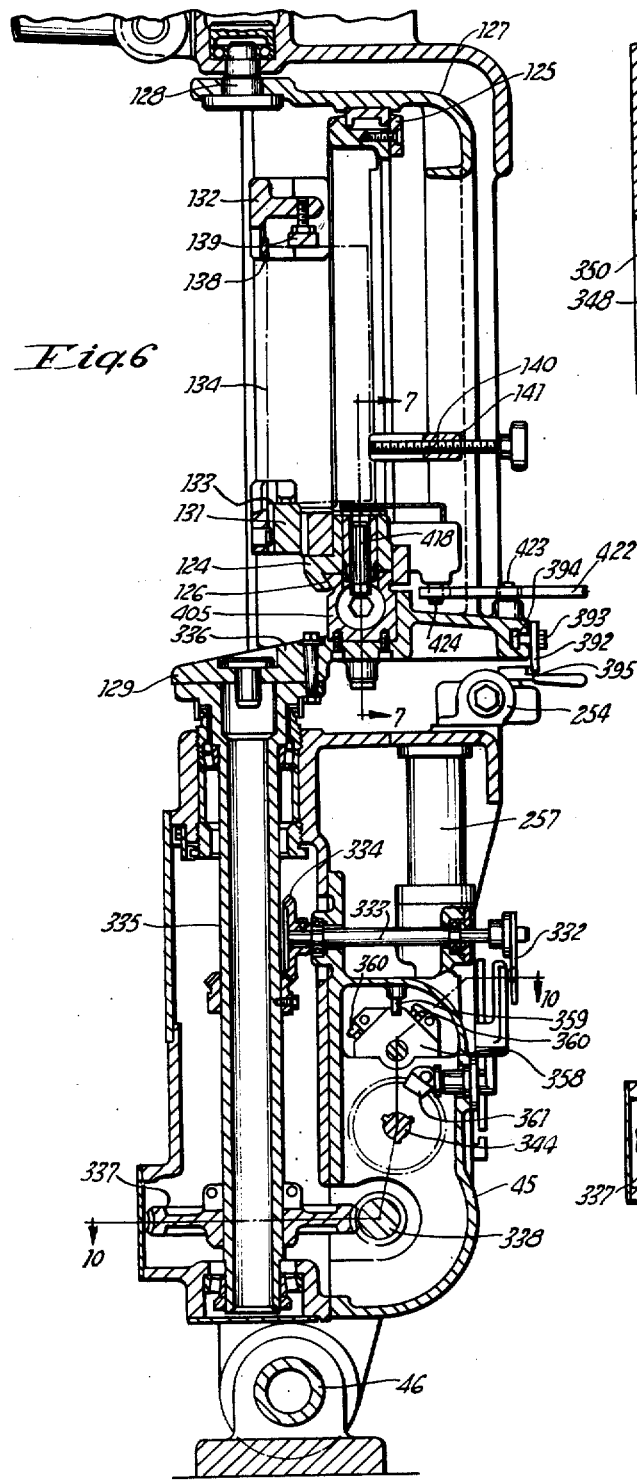

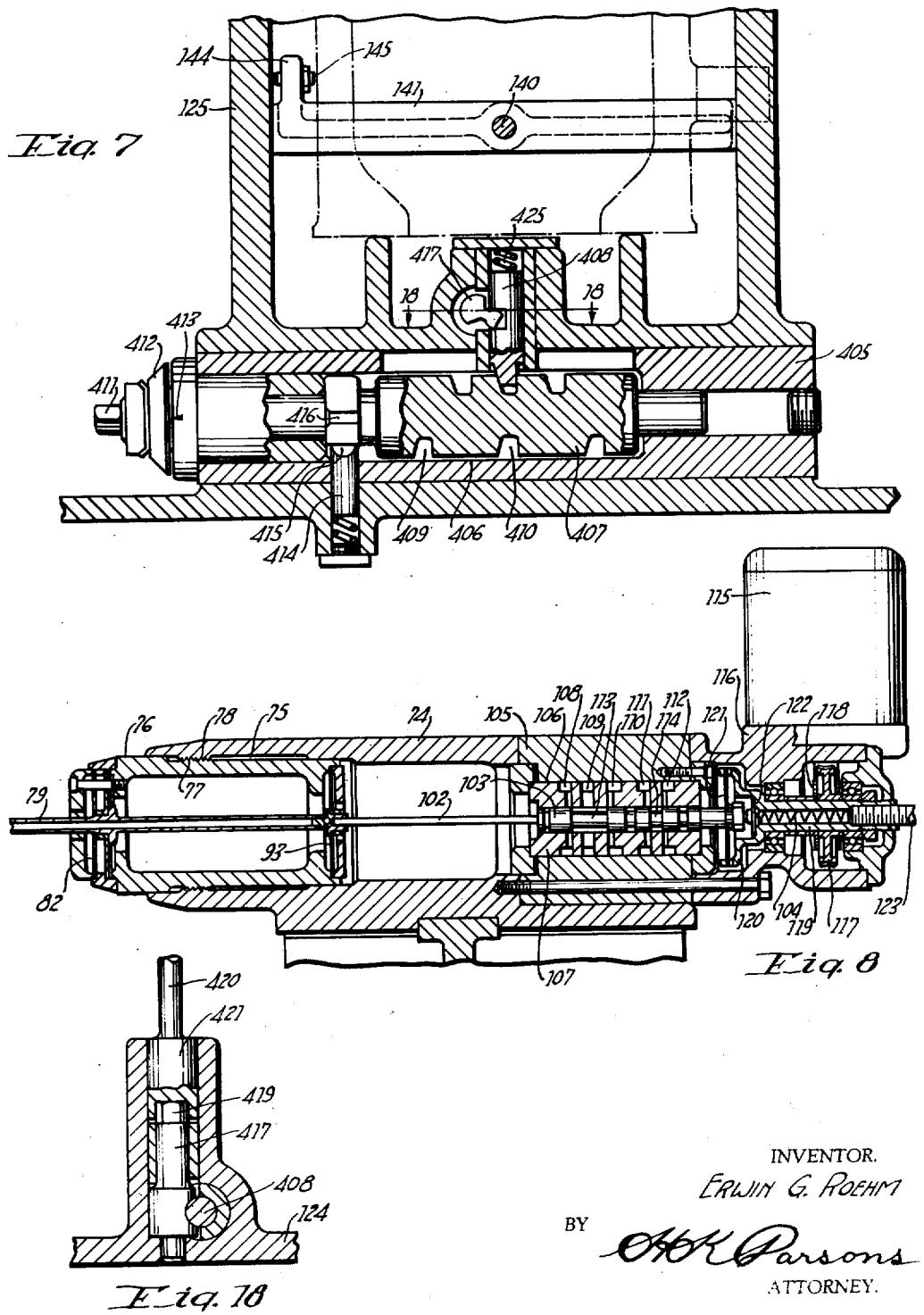

March 15, 1938. E. G. ROEHM 2,111,332
MULTIPLE AUTOMATIC PATTERN CONTROLLED MILLING MACHINE
Filed April 23, 1937 11 Sheets-Sheet 7
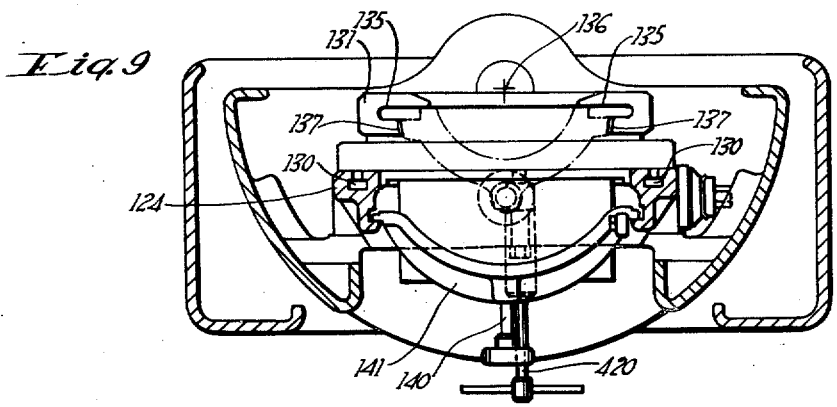
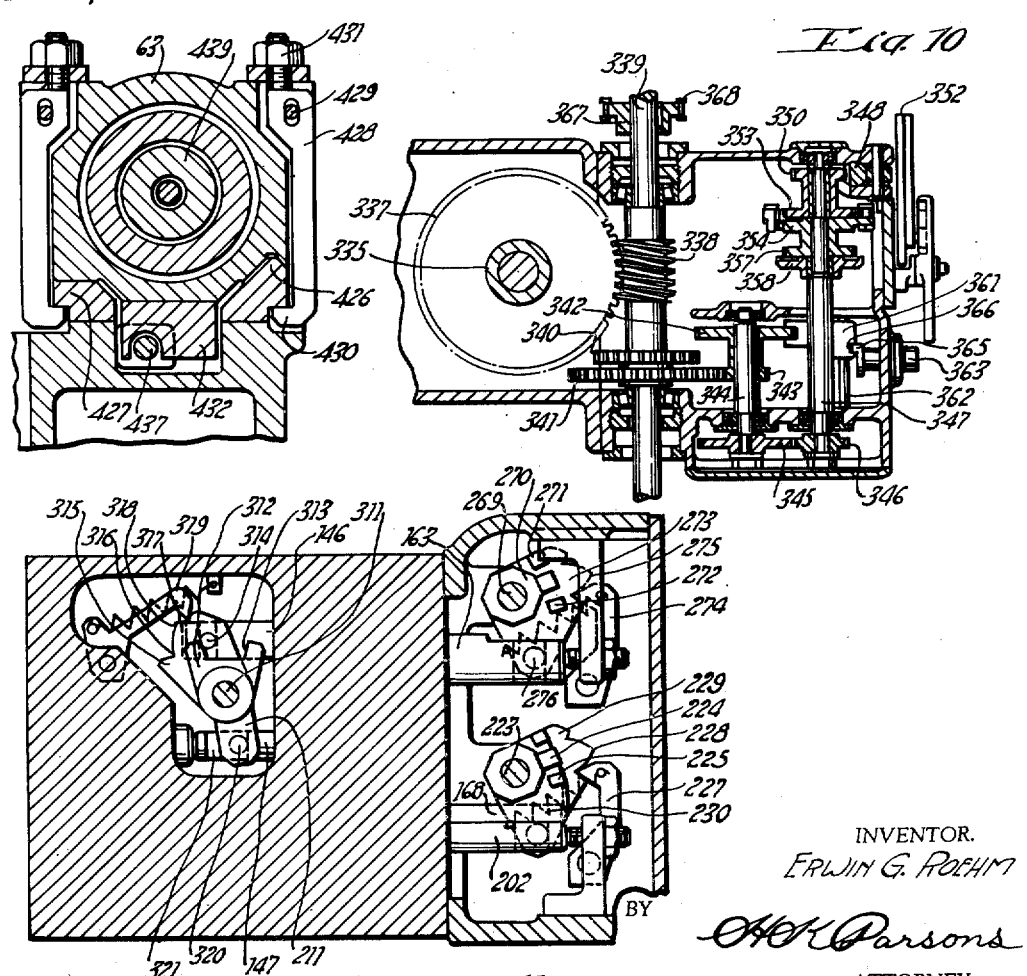
INVENTOR.
ERWIN G. ROEHM
BY
A. H. Parsons
ATTORNEY.

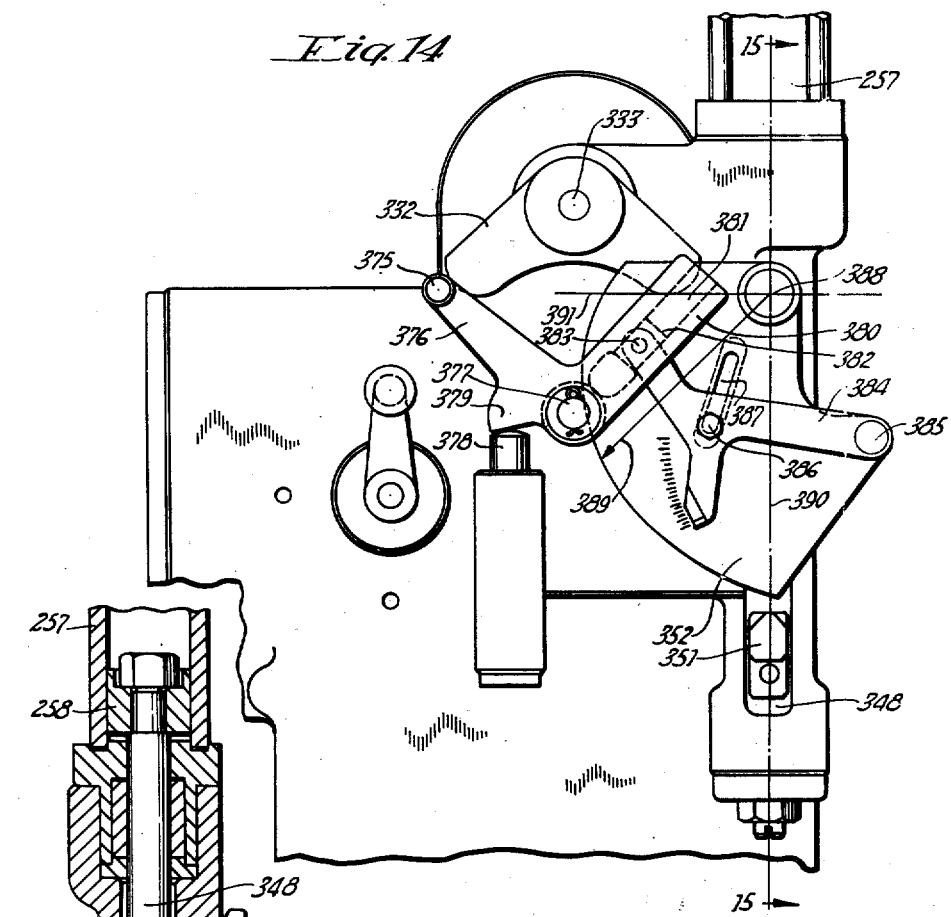

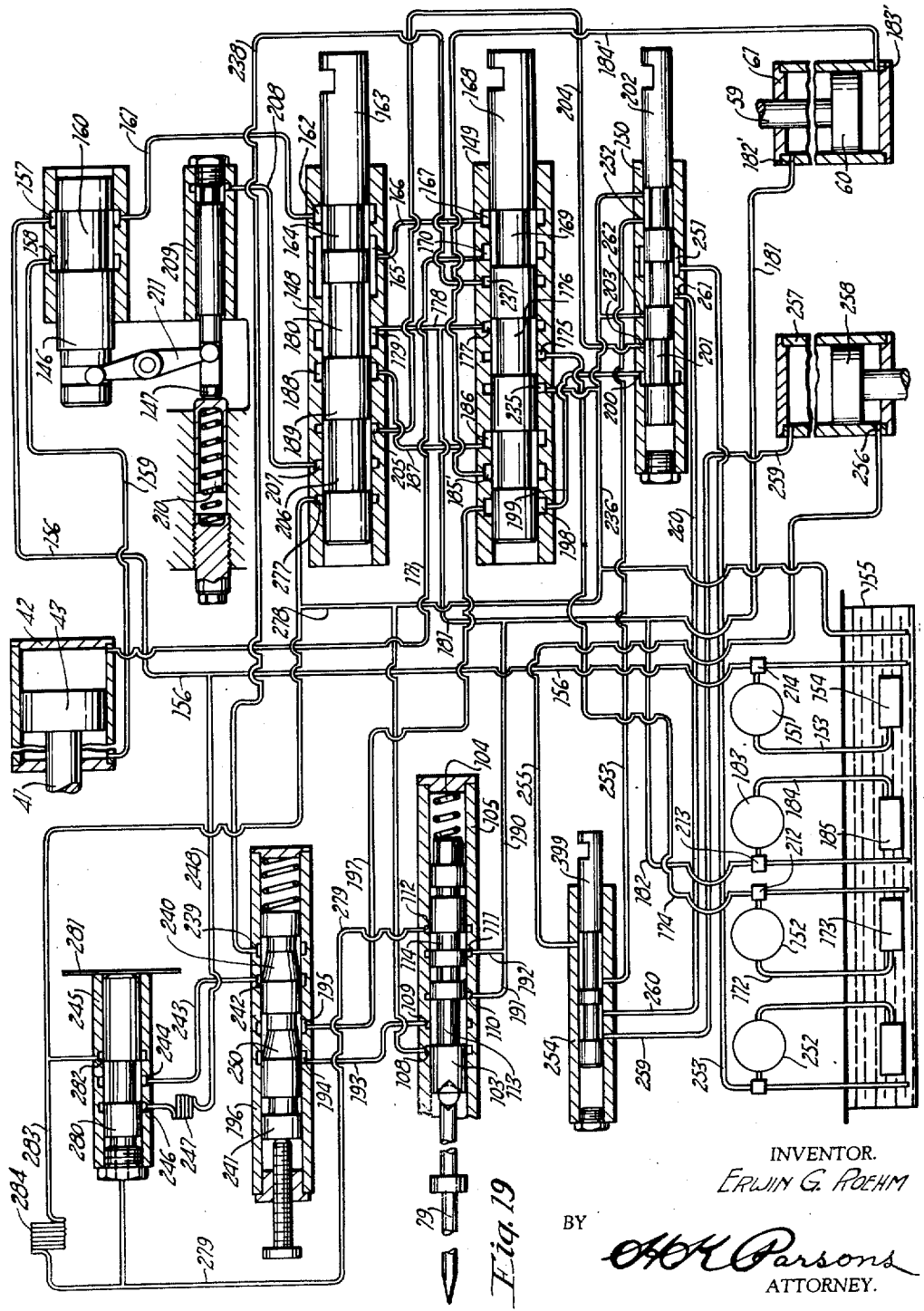

March 15, 1938. E. G. ROEHM 2,111,332
MULTIPLE AUTOMATIC PATTERN CONTROLLED MILLING MACHINE
Filed April 23, 1937 11 Sheets-Sheet 10
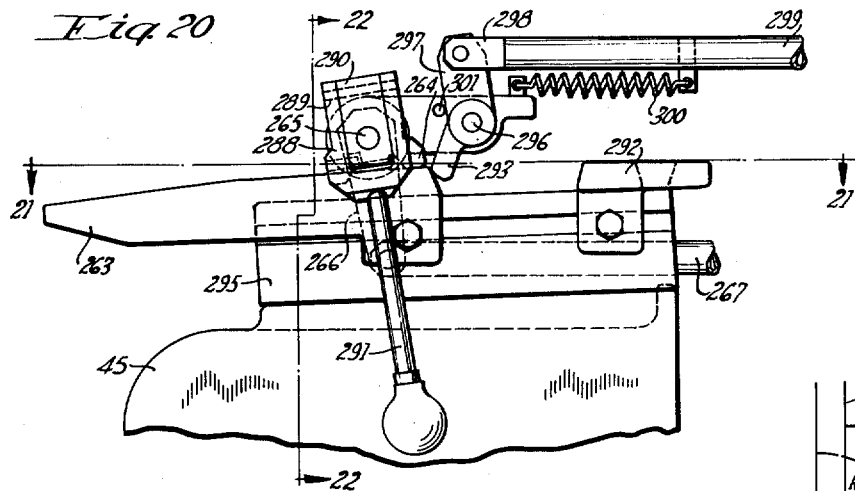
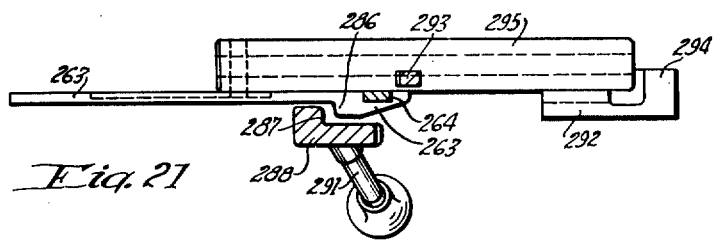
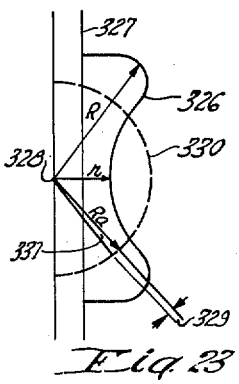
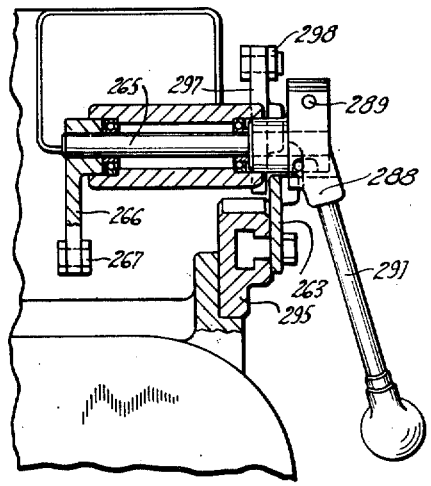
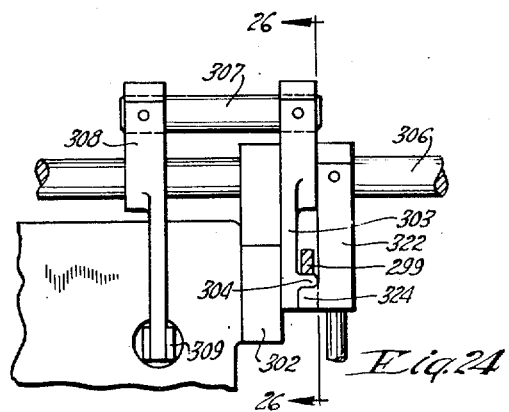
INVENTOR.
ERWIN G. ROEHM
BY
AHParsons
ATTORNEY.

March 15, 1938.  E. G. ROEHM  2,111,332
MULTIPLE AUTOMATIC PATTERN CONTROLLED MILLING MACHINE
Filed April 23, 1937  11 Sheets-Sheet 11
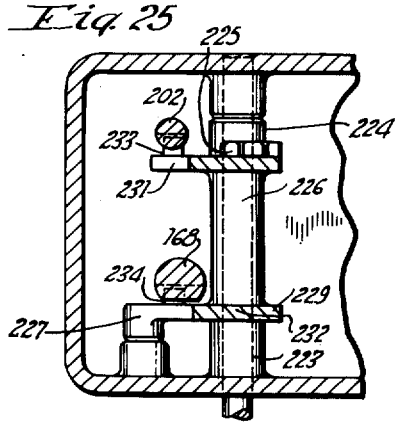
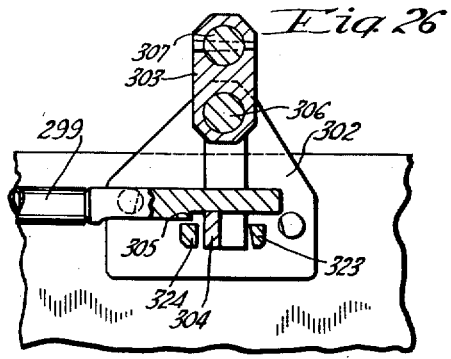
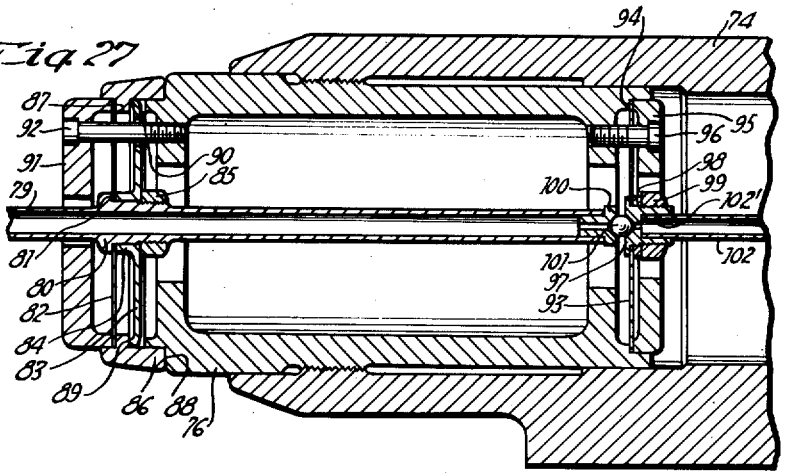
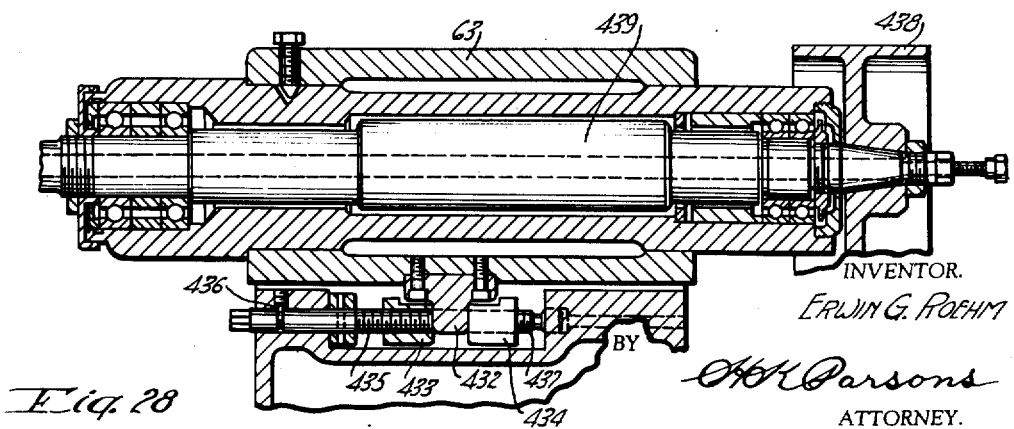
INVENTOR.
ERWIN G. ROEHM
BY
A. K. Parsons
ATTORNEY.

Patented Mar. 15, 1938

2,111,332

UNITED STATES PATENT OFFICE 2,111,332

MULTIPLE AUTOMATIC PATTERN CONTROLLED MILLING MACHINE

Erwin G. Roehm, Norwood, Ohio, assignor to The Cincinnati Milling Machine Company, Cincinnati, Ohio, a corporation of Ohio Application April 23, 1937, Serial No. 138,639

39 Claims. (Cl. 90—13.5)

This invention relates to die sinking machines, and more particularly to an automatic multiple pattern-controlled machine tool.

Certain industries depend almost entirely upon dies for imparting the necessary shape or configuration to their articles of manufacture, and this is especially true in the bottle-making industry. Such dies are usually made in two halves, which are assembled for casting purposes, and subsequently separated to remove the cast article. It will be apparent that the halves of the die will have a cavity of semi-cylindrical shape for the manufacture of ordinary round bottles; and various other shapes for odd shaped bottles, which may be generally classified as quasi semi-cylindrical.

If these cavities had sufficient size, a cutting tool could be mounted for swinging movement about a center lying in the parting line of the mold. This would permit the best cutting action because it is recognized that an end mill or end cutting tool operates most satisfactorily when maintained perpendicular to a tangent to the surface at the point of contact with the tool. In the type of dies under consideration, it is rarely possible to mount the tool in this relation to the mold on account of the smallness of the cavities.

One of the objects of this invention is to provide a machine of the character described in which the cutting tool and the mold are so supported and manipulated during the progress of the cutting operation that a better cutting angle between the tool and the work is maintained throughout the operation than has been possible in prior machines.

Another difficulty in the formation of the particular dies or molds under consideration is when the feeding cut is being taken longitudinally of the mold, and the index feed effected in a cross-sectional plane, that due to the acute angular relationship between the axis of the cutter and the tangent to the surface at the point of contact with the cutter, said tangent lying in a cross-sectional plane, a uniform angular index to the mold will not produce a uniform indexing movement between the cutter and the work as measured along the surface being produced.

It is one of the objects of this invention to provide a novel and improved indexing mechanism which will produce a substantially uniform length of indexing movement as measured along the surface being produced, regardless of its shape, or the angular relationship of the cutter axis to the tangent at the point of contact with the surface.

It is another object of this invention to provide a machine of the character described in which the work and tool are mounted on swinging supports rather than sliding supports, and in such a balanced manner that a minimum of power is required to manipulate them during the cutting operation.

A further object of this invention is to provide an automatic pattern controlled machine tool which is capable of producing a plurality of dies or molds simultaneously from a single pattern.

An additional object of this invention is to provide an hydraulically operated automatic pattern controlled machine tool in which the operating fluid is automatically and continuously cleansed during the operation of the machine and in which the temperature of said fluid is maintained substantially constant within limits, thereby eliminating the necessity for viscosity compensating devices.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 2 is a front view of a portion of the machine shown in Figure 1 with certain parts broken away, and other parts in cross-section.

Figure 3 is a cross-section through the machine as viewed on the line 3—3 of Figure 2.

Figure 4 is a cross-section through the reservoir tank.

Figure 5 is a section through the machine showing a cutter support and work support unit in elevation, as viewed on the line 5—5 of Figure 2.

Figure 6 is a section through the pattern support unit as viewed on the line 6—6 of Figure 2.

Figure 7 is a detail section taken on the line 7—7 of Figure 6.

Figure 8 is a vertical cross-section through the tracer support unit shown in Figure 3.

Figure 9 is a cross-section through the pattern support housing as viewed on the line 9—9 of Figure 2.

Figure 10 is a section through the pattern support housing as viewed on the line 10—10 of Figure 6, showing the indexing drive mechanism.

Figure 11 is a section through the valve block as viewed on the line 11—11 of Figure 3.

Figure 12 is a detail view of the ratchet mechanism as viewed on line 12—12 of Figure 2.

Figure 13 is a section on the line 13—13 of Figure 2 showing the index drive mechanism to the work support.

Figure 14 is an enlarged view of the variable index feed control mechanism.

Figure 15 is a detail section on the line 15—15 of Figure 14.

Figure 16 is a section through the reversing valve for the indexing cylinder as viewed on the line 16—16 of Figure 2.

Figure 17 is a horizontal section through the work holder unit.

Figure 18 is a detail section on the line 18—18 of Figure 7.

Figure 19 is a diagrammatic view of the hydraulic control circuit.

Figure 20 is an enlarged detail view of the trip control mechanism associated with the pattern support.

Figure 21 is a section on the line 21—21 of Figure 20.

Figure 22 is a section on the line 22—22 of Figure 20.

Figure 23 is a diagram for use in explaining the principle of indexing.

Figure 24 is an enlarged detail section as viewed on the line 24—24 of Figure 3.

Figure 25 is a section through the valve block as viewed on the line 25—25 of Figure 3.

Figure 26 is a section on the line 26—26 of Figure 24.

Figure 27 is an enlarged detail of portions of the tracer support.

Figure 28 is a section through one of the cutter carriers showing a low speed cutter spindle unit substituted for a high speed spindle unit.

Figure 29 is a section on the line 29—29 of Figure 28.

Figure 1:
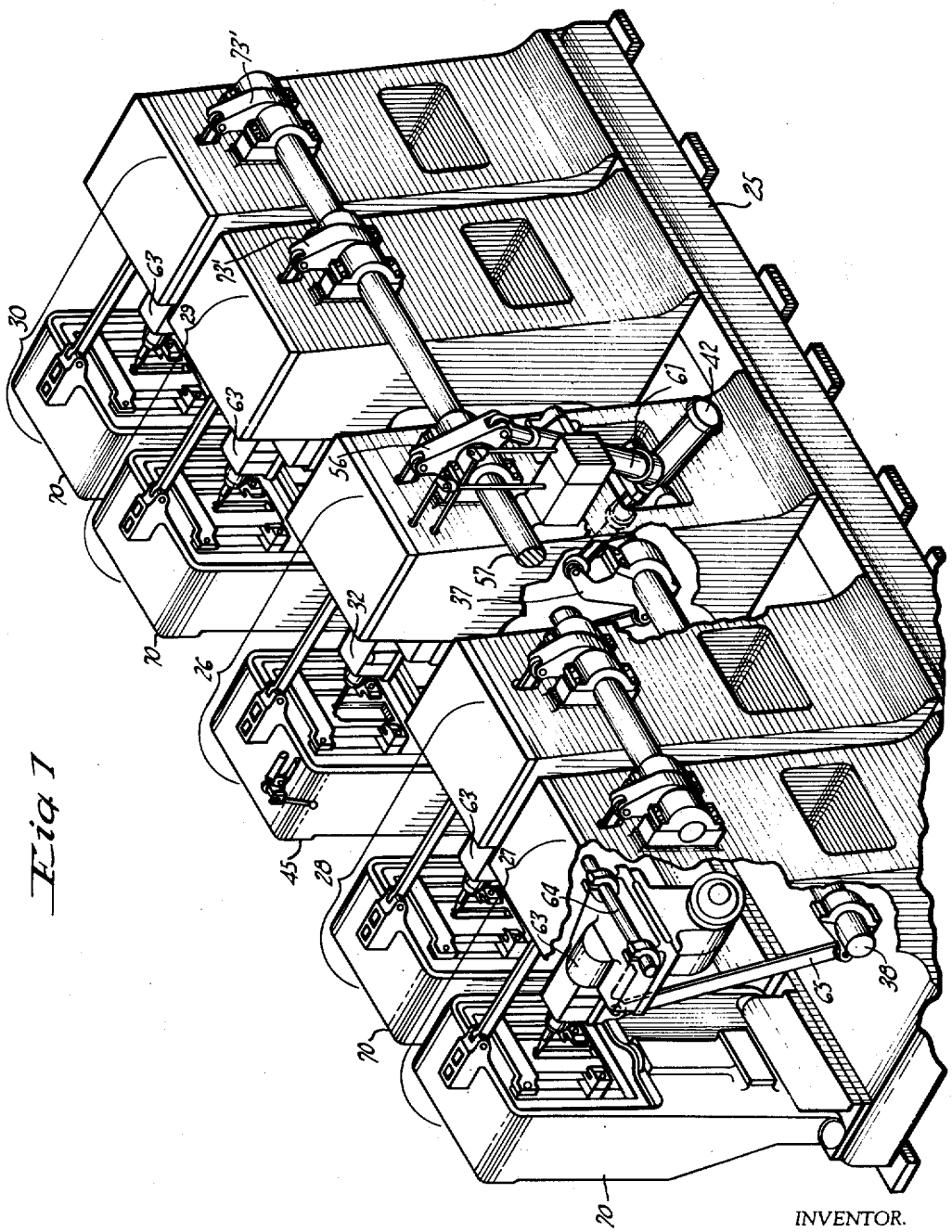
Figure 1 is a perspective view of a machine embodying the principles of this invention, having partially broken-away parts to bring out certain features of the operating mechanism.

Referring to Figure 1 of the drawings, the reference numeral 25 indicates the base or main support of the machine which has a predetermined width, but may be made of any suitable length depending upon the number of cutting units to be mounted thereon. This machine is a multiple die-sinking machine, and to that end there is mounted upon the support, a central unit 26, which may be termed the control unit, because it includes the pattern and tracer; the feeding mechanism which is automatically controlled by the tracer; and the indexing mechanism by means of which the tool and work are relatively indexed after each cutting stroke. Mounted on opposite sides of the control unit are a plurality of cutting units 27, 28, 29, and 30. For illustrative purposes there is shown two cutting units on each side of the central control unit, but this number may be increased or decreased as desired, or the cutting units may be mounted all on one side or the other of the control unit, without departing in any way from the principles of this invention.

Referring to Figure 3, the control unit 26 consists of a column 31 which is fixed with the bed 25, for pivotally supporting on one vertical face a tracer control unit 32. This unit is trunnioned at 33 to the column, and actuated by a link 34 which is pivotally connected at 35 to the tracing unit, and at 36 to a crank 37 fixed on an oscillatable shaft 38. The crank 37 has an arm 39 which is pivotally connected at 40 to a piston rod 41. The piston rod passes through one end of a cylinder 42, for attachment to a piston 43. The cylinder 42 is trunnioned to swing about a pivot 44. It will now be evident that admission of fluid pressure to the right hand end of cylinder 42 will cause counterclockwise rotation of the crank 37 and a downward swinging movement of the tracer unit 32; while admission of fluid pressure to the other end of the cylinder will cause a reverse direction of movement of the connected parts.

In this machine the cutting is performed during the upward swinging movement of the tracer and connected cutters, and therefore fluid pressure is forced into the left end of cylinder 42 to effect the feeding or cutting stroke, and after separation of the work from the cutters, fluid is forced into the right hand end of cylinder 42 to effect a rapid traverse downward movement.

The pattern which cooperates with the tracer is supported in a swinging carrier 45 which is trunnioned at 46 to the bed 25 for movement toward and from the tracer support. It will be noted that the dead weight of this carrier is carried at all times by the bed 25, and that it stands in substantially a perpendicular position so that very little effort is necessary to swing the carrier toward and from the tracer unit. As shown in Figure 2, the carrier 45 has an upwardly extending lug 47 upon the sides of which are formed guide surfaces 48 and 49 which are in contact with guide surfaces 50 and 51 formed in a bracket 52 which overhangs from the column 31. This guiding means insures against any side sway or weaving of the carrier during the "in and out" movement.

The carrier 45 is oscillated toward and from the tracer unit by means of a link 53 which is pivotally connected at 54 to the carrier, and at 55 to a crank 56 which is integrally secured to a longitudinally extending oscillatable shaft 57. The crank 56 has a pivotal connection at 58 with piston rod 59, to the end of which is attached the piston 60, which is contained in the cylinder 61.

The cylinder 61 is trunnioned at 62 on the back of the column 31, for free oscillation in accordance with the movement of the pivot 58 about the shaft 57. It will now be evident that if pressure is admitted to the lower end of cylinder 61 that the pattern support 45 will move away from the tracer support, and that if pressure is admitted to the upper end of the cylinder, the pattern support will move toward the tracer support. For the purposes of description, the movement of the pattern carrier 45 will be referred to as the "in and out" movement.

Referring to Figure 5, each cutting unit consists of a column member 31, which is similar to that shown in Figure 3, for supporting upon one vertical face a bracket 63 which is trunnioned at 64. This bracket is connected by a link 65 to a crank 66 integral with the shaft 38. A cutter spindle 67 is journaled in a quill 68 carried by the bracket 63, and the other end of the spindle projects beyond its bearing so that it may be provided with a pulley 68'.

This pulley is connected by a belt 69' or other motion transmitting band, to a two step pulley 69 secured to the armature shaft of an electric motor 69". It will be noted that the motor is attached to the bracket so that its center of gravity is substantially under the center of the trunnion 64 so as to act as a balancing means for the pivoted bracket and thereby eliminate as far as possible any concentrated downward thrust on the link 65.

It will be noted that the shaft 38 is the same shaft as that shown in Figure 3, and this shaft extends longitudinally for the full length of the machine, so that all of the cutter spindle brackets may be operatively connected thereto for simultaneous actuation thereby. Therefore the hydraulic motor consisting of the piston and cylinder 42 and 43 shown in Figure 3, constitutes a common motor for effecting a longitudinal feed of all of the cutter spindles.

Each cutting unit also includes a swinging carrier 70, in which is mounted a work support and this carrier is supported and operated in the same manner, as the carrier 45 shown in Figure 3. In other words the carrier 70 is pivoted at 71 to the bed 25 and guided at 72 in an overhanging bracket 73 projecting from the column 31. This carrier is also connected by a link 72' to a crank arm 73 which is integral with the shaft 57. As seen in Figure 1, the shaft 57 extends longitudinally throughout the length of the machine and serves as a common actuator for moving the work supporting carriers toward and from the cutting tools.

*Tracer control mechanism*

The tracer control mechanism is more particularly shown in Figures 8 and 27 of the drawings, in which the reference numeral 74 indicates the tracer head which, as more particularly shown in Figure 3, is secured to the tracer control unit 32. This head has a tubular opening 75 in which is fitted a sleeve 76, the sleeve having a threaded portion 77 adapted to interengage threads 78 which are cut on the interior of the housing. The sleeve 76 supports the tracer arm 79 for universal movement in the following manner. The tracer arm has an enlarged portion 80 which serves to form a shoulder 81. Against this shoulder there is placed a thin metal diaphragm 82, and against that is placed a metal disc 83, which has a boss 84 formed integral with one side, which serves as a separator between the disc and the diaphragm. A nut 85 is threaded on the tracer arm 79 and serves to clamp these parts against the shoulder 81. A ring 86 surrounds the disc and diaphragm and this ring has an internal annular projection 87 which is of the proper thickness to fit between the opposing faces of the diaphragm and disc and act as a filler block and also as a support against which the diaphragm may be clamped. The ring 86 has a face 88 which abuts against the end of the sleeve 76 and this face is so spaced from the shoulder 89 that a clearance space 90 is provided between the opposing faces of the disc and the end of the sleeve 76. The parts so far described may be assembled upon the tracer arm 79 and then inserted in the end of the sleeve 76 after which they may be clamped in place by the member 91 which is dish shaped so as to provide a narrow annular face which will engage the periphery of the diaphragm 82 and clamp it against the ring 86. The clamping bolts 92 pass through clearance holes in the disc and diaphragm and are threaded in the end of the sleeve 76. From this it will be seen that the tracer arm 79 is supported by the diaphragm 82. When the tracer is deflected, some point on the periphery of the disc 83 acts as a fulcrum causing inclination of the disc 83 which is permissible because of the clearance space 90, and deflection of diaphragm 82, which acts to urge the parts back to normal position.

A second diaphragm 93 is secured in the other end of the sleeve 76 between an annular shoulder 94 and a clamping member 95 which is held in place by clamping bolts 96 passing through clearance holes in the diaphragm and threaded in the end of the sleeve. A shouldered member 97 passes through a central hole in the diaphragm and is fastened thereto by means of a filler block 98 and a nut 99 threaded on the reduced end of the member 97.

The tracer arm 97, which may be a tubular member, has a plug 100 fitted in the end thereof, and the opposing faces of this plug and member 97 have spherical shaped depressions for receiving a ball 101.

A tubular connecting member 102 is tightly fitted in an axial bore 102' formed in the end of the shouldered member 97 which is supported by the diaphragm 93. The other end of the member 102 engages the end of the tracer control valve plunger 103, the valve plunger being held in engagement with the end of member 102 by means of a spring 104.

The valve member 103 has a central or neutral position in which during the cutting stroke, it holds the piston 60 against movement; a second position to one side of this neutral position in which it causes movement of piston 60 in one direction; and a third position on the other side of said neutral position in which it causes movement of piston 60 in an opposite direction. By means of this arrangement it is possible for the tracer to control the "in and out" movement of the pattern and work supports automatically during the cutting stroke.

It is desirable, of course, that when the tracer is out of contact with the pattern, that the valve plunger 103 be in such a position that it will cause the pattern and work supports to move toward the tracer and cutters.

Therefore the spring 104 should be sufficiently strong to urge the valve 103 and deflect the diaphragms 93 and 82 to the left as viewed in Figure 8, a sufficient amount so that the valve 103 will cause a flow of fluid to the cylinder 61 in such a manner that the piston 60 will cause the correct direction of movement of the connected supports. This will make it possible when the tracer engages the pattern for the pattern to move the tracer arm to the right, as viewed in Figure 8, a sufficient amount to take the deflection out of the diaphragms and move the valve 103 to a central position. From this it will be apparent that upon assembly of this tracer mechanism, the connecting arm 102 should be of such length that when the diaphragms 82 and 93 are undeflected, that the valve 103 will be in its central or neutral position.

The tracer control valve consists of a valve body 105 in which is formed a bore 106. Mounted in this bore are a plurality of discs 107 of varying thickness, some of which are provided with annular shoulders on the end face or faces, and radial slots, so that when they are all assembled in the bore 106 they serve to form five annular grooves or ports 108, 109, 110, 111 and 112. The valve plunger 103 has a first annular groove 113 which is of such length that when the valve is in a neutral position it will only extend to the edge of ports 108 and 110 so that both of these ports are closed with respect to port 109; and a second annular groove 114 which is of such length that it interconnects port 111 with port 112 whereby upon movement of the valve plunger 103 in either direction from its neutral position it will restrict the flow from port 111 to port 112, by closing one or the other of these ports dependent upon the direction of movement.

Since this machine is a precision machine, a precaution is taken against fine particles of dirt or other foreign matter impeding free movement of the valve, by providing means for constantly rotating the valve. This also aids in preventing the valve from sticking due to inequality in the lateral pressures on the valve at the various points opposite the different ports. By continuously rotating the valve, a thin film of oil around the valve is assured which acts as a lubricant to prevent sticking. The valve rotating means consists of a small fractional horse power electric motor 115 which is supported on a frame 116 secured to the end of the valve body 105, and within this frame is antifrictionally journaled, a worm wheel 117, which is driven by a worm 118 secured to the end of the armature shaft of the motor.

The worm wheel is supported in axial alignment with the valve plunger 103, and is mounted on a sleeve 119 which has an enlarged head 120. The valve plunger 103 has a diaphragm 121 secured to the end of it, and this diaphragm has a pair of diametrically opposed ears which engage in slots formed on a flanged portion of the head 120 whereby rotation of the head will cause rotation of the valve without interfering with its longitudinal movement. The spring 104 previously referred to, is supported within the sleeve 119, and a suitable member 122 is interposed between the end of the spring and the valve, to transmit the pressure thereto. An adjusting screw 123 is threaded in the end of sleeve 119 to vary the tension of spring 104.

*Pattern and work supports*

The pattern and the work are supported in fixtures which are identical in construction and therefore a description of one will suffice for all. Referring to Figures 3, 6, 7, 9 and 17, the fixture itself comprises a rectangular frame 124 which, as shown in Figure 6, is provided at the top with a rectangular guide surface 125 and at the bottom with a guideway 126. This permits movement of the frame relative to its supporting cradle 127 which has a top trunnion 128 and a bottom trunnion 129 whereby the cradle may swing relative to the frame. By mounting the cradle 127 for oscillation about its trunnions 128—129 makes it possible to index the pattern and work after each cutting stroke.

The rectangular frame 124 is provided with a pair of vertically extending T-slots 130, Figure 9, by means of which a pair of cross bar supports 131 and 132 may be secured in various vertically adjusted positions on the frame. The lower cross bar 131 has a horizontal surface 133 upon which the pattern or work, represented by the dot-and-dash line 134, is supported; a pair of vertical surfaces 135 against which the mold is clamped to lock it relative to the axis 136 about which the cradle swings; and a second pair of vertical dove-tail surfaces 137 which engage the sides of the mold to prevent spreading thereof when the same is clamped.

The top cross bar 132 is provided with a vertical surface 138 against which the face of the mold is clamped and a plurality of adjustable set screws 139 for engaging the top of the mold and preventing the same from lifting during the cut.

The mold is clamped in position by means of a clamping screw 140 which is threaded through a U-shaped bracket 141 which, as shown in Figure 17, has ears 142 at each end which project into vertically extending rectangular slots 143 formed in the frame 124. In order to hold the bracket 141 in any given vertical position, the bracket 141 is provided with an upstanding lug 144 through which is threaded a set screw 145, as more particularly shown in Figure 7. This set screw tends to shift the bracket 141 laterally of the frame 124 and thereby hold it in the position by wedging the same between the sides of the frame 124. It will be apparent that the specific details of the fixture may be varied in accordance with the size and shape of the molds to be reproduced, but in principle the fixtures provide a vertical locating surface against which the parting face of the mold may be clamped and means in back of the mold for clamping and holding the mold against this locating surface together with means to prevent the face of the mold from separating due to the fact that the mold is somewhat semi-cylindrical in shape and the clamping force applied to the mold is in such a direction and in such a position that it might cause a certain amount of spreading.

*The hydraulic tracer control circuit*

This machine is hydraulically operated and in Figure 19 there is shown a diagram of the complete hydraulic circuit. In this circuit there is shown a stop valve 146, a stop valve operating plunger 147, an "in and out" control valve 148, a longitudinal control valve 149, and an index control valve 150. All of these valves are in a position corresponding to rapid traverse movement of the cutter and tracer downward to a starting position. During this movement all of the various carriers are moved out so that the work pieces are out of engagement with their respective cutters and the pattern is out of engagement with the tracer. This means that the tracer control valve plunger 103 is shifted to the left of its neutral position as viewed in Figure 19 by the spring 104. During this rapid traverse movement, the piston 60 which controls the "in and out" movement of the carriers remains stationary, and the piston 43 moves rapidly toward the left as viewed in Figures 3 and 19 to thereby move the tracer and cutter downward to a starting position. This movement is effected by the "longitudinal" pump 151 assisted by the rapid traverse pump 152.

The pump 151 has an intake 153, by which fluid is drawn through a strainer 154 from a reservoir 155; and a delivery pipe 156, which is connected to port 157 of the stop valve 146. This valve has another port 158, which is connected by channel 159, to the small end of piston 43. Since the same unit pressure of the pump is acting on both ends of piston 43, and since one end is larger in area than the other, the piston 43 will move to the left as viewed in Figure 19, whereby the fluid in the left end of cylinder 42 will be returning through channel 159 to port 158 of the stop valve. In other words, there will be an incoming flow through ports 157 and 158 which will combine in the annular groove 160 formed in the stop valve plunger 146. This combined flow will continue through channel 161 to port 162 of the "in and out" control valve 148.

This valve has a plunger 163, in which is formed an annular groove 164, which, in the position shown, connects port 162 to port 165. This port is connected by channel 166 to port 167 of the "longitudinal" control valve 149. In the position of the plunger 168 of this valve, an annular groove 169 connects port 167 to port 170. The port 170 is connected by channel 171 to the right hand end of cylinder 42. It will now be seen that the flow from pump 151 and the flow from the left end of cylinder 42 is combined in the stop valve, and will flow through the interconnections just mentioned to the right hand end of cylinder 42.

This flow is further increased by the rapid traverse pump 152, having an intake 172, through which fluid is withdrawn from reservoir 155 through a strainer 173, and a delivery channel 174, which leads to port 175 of the "longitudinal" control valve 149. At this time the port 175 is connected by annular groove 176 to port 177, which in turn is connected by channel 178 to port 179 of the "in and out" control valve 148. The plunger 163 has a second annular groove 180 which is of sufficient length that the port 179 is interconnected with the port 165.

It will be noted that it was through this port that the combined flow from pump 151 and the left end of cylinder 42 passed. And it is at this port that the flow from the rapid traverse pump is combined with this previously mentioned flow to increase the total volume delivered to the right hand end of cylinder 42 and thereby cause rapid traverse movement of the contained piston.

It will be noted that the channel 178, which interconnected port 177 of the "longitudinal" control valve 149, with port 179 of the "in and out" control valve 148, has a branch line 181 to which is connected the delivery channel 182 of the "in and out" supply pump 183. This pump also has an intake 184 for withdrawing fluid through a strainer 185 from the reservoir 155. The channel 181 terminates at the port 182' formed in one end of the "in and out" cylinder 61. This will not cause movement of the contained piston, however, because the other port 183' of this cylinder is connected by channel 184' to interconnected ports 185' and 186, and channel 187 to port 188 of the "in and out" control valve 163, which port is closed at this time by the spool 189 on the plunger 163.

Since the delivery from pump 183 cannot cause any displacement of the piston 60 in the cylinder 61, the practical result will be that the delivery from this pump will pass through channel 181 and combine with the delivery from the rapid traverse pump, which is now flowing through channel 178 and to which channel the line 181 is connected. From this it will be seen that all three pumps 151, 183, and 152 combine to cause the rapid downward movement of the cutter and tracer supports.

Attention is invited to the fact that the channel 181 through which the delivery from pump 183 is flowing, has a branch line 190 which is connected by sub-branches 191 and 192 to ports 110 and 111 of the tracer control valve. Since this valve is to the left at this time, it closes the sub-branches 191 and 192 so that no fluid will be escaping therethrough. It is possible, however, to connect the port 191 in case of emergency to the stop valve operating plunger 147. In other words, during this rapid traverse movement, if the tracer should hit a foreign obstruction and thereby shift the valve 183 to the right, the port 191 will be connected to port 169 and fluid will then flow through channel 193, interconnected ports 194 and 195 of the double throttle valve 196, channel 197, annular groove 198 of the "in and out" valve 148 which is connected by channel 199 to port 200 of the index control valve 150.

At this time the port 200 is connected by an annular groove 201 formed in plunger 202 of this valve to port 203. A channel 204 connects this port to port 205 of the "in and out" control valve 162. Plunger 163 of this valve has an annular groove 206 which interconnects ports 205 to port 207 so that the fluid continues to flow through channel 208 into the right hand end of cylinder 209 in which is slidably mounted the plunger 147. When this happens, the plunger 147 is shifted to the left against the resistance of spring 210 and thereby actuates, through the crank 211, the stop valve plunger 146, and shifts the same to the right thereby closing port 158, and preventing the escape of fluid from the left end of cylinder 42. This will act as a sort of cushioned stop to the movement and if a high pressure builds up in the delivery channels of the various pumps, the emergency relief valves 212, 213, and 214 associated with the respective pumps will open.

At the end of the rapid traverse movement, a trip dog 215, which is shown in Figure 3 as secured to a T-slot 216 formed in a depending bracket 217 of the tracer support 32, actuates a trip lever 218. This lever is pivotally supported at 219 by the column, and has an integral crank 220 which is connected by a link 221 to a crank 222 secured to the lower end of rod 223. As more particularly shown in Figures 11 and 25, a crank arm 224 secured to the upper end of this rod engages an upstanding lug 225 formed on a valve shifter 226 which is supported for free rotation relative to the shaft 223. It will be noted that there is a certain amount of lost motion to be taken up before the crank 224 engages the lug 225. When this lost motion is taken up the shifter 226 is rotated a sufficient amount to cause the spring pressed detent 227 to ride over the peak 228 formed on a notched plate 229 integral with the shifter whereupon a spring 230 will cause the detent lever 227 to complete the movement of the shifter. This constitutes a form of load-and-fire mechanism for actuating the shifter member 226.

Referring to Figure 25, it will be noted that the shifter 226 is provided with two actuating arms 231 and 232, the former of which has a pin 233 interfitting in a notch formed in the end of the index valve plunger 202 and the latter having a pin 234 interfitting in a notch formed in the end of the "longitudinal" valve plunger 168. Therefore when the trip lever 218 is thrown by the dog 215, both the "longitudinal" valve plunger and the index valve plunger are shifted to the left, as viewed in Figure 19. The effect of this is to stop the rapid traverse movement of the cutters and tracer, initiate an indexing movement of the work and pattern, and also to initiate an inward movement of the pattern and work toward the tracer and cutters. This is brought about in the following manner.

When the valve plunger 168 is shifted into its left hand position, it establishes three new connections. First, it interconnects port 175 with port 235 whereby the rapid traverse pump is disconnected from the actuating cylinders and connected to the reservoir line 236. This disconnects the rapid traverse pump from the entire circuit. Secondly, it disconnects port 170 from port 167, thereby cutting off the pump supply to cylinder 42 which was causing the rapid traverse movement; and it interconnects port 170 with port 237.

By means of channel 238, the port 237 is connected to port 239 of the double throttle valve 196. A tapered spool 240 formed on the plunger 241 of this valve, serves to interconnect port 239 with port 242, which in turn is connected by channel 243 to port 244 of a secondary control valve 245.

The secondary control valve has a pressure port 246 which is connected through an hydraulic resistance 247 and branch line 248 to the delivery channel 156 of pump 151. It will be noted that the pump 151 is connected directly to one end of cylinder 42 and through the hydraulic resistances 247 and tapered spool 240, which also causes a drop in pressure, to the other end of cylinder 42. The hydraulic resistances 247 and 248 cause a sufficient drop in pressure in the fluid supplied to the large end of piston 43, that the total resultant pressure on the large end of the piston is equal to the total resultant pressure on the other end, whereby no movement of the piston takes place and therefore the downward movement of the tracer and cutters must stop.

The third or last connection effected by plunger 168 is the intercoupling of port 185' with port 198, whereby one end of cylinder 61 is coupled to reservoir. This is true because the line 197 leading from port 198 is connected to port 195 of the double throttle valve 196, and due to the position of the tapered spool 250, port 195 is interconnected with port 194. As previously described, this port is connected by channel 193 to port 109 of the tracer valve, and since the tracer valve at this time is in its left hand position, the port 109 is interconnected to port 108 which leads to reservoir. Since the other end of the cylinder 61 is directly connected through channels 181 and 182 to pump 183, the piston 60 will be moved rapidly in a direction to swing the carriers 45 and 70 in toward the cutters and tracer.

The index valve 150 has a pressure port 251 which is supplied from a separate pump 252 through channel 253. When the index valve plunger 202 is shifted to the left as previously mentioned, it interconnects the port 251 with port 252 whereby the fluid will flow through channel 253, feed-stop valve 254, and channel 255 to port 256 of cylinder 257. A piston 258 contained in the cylinder actuates an indexing mechanism (the specific construction of which will be described later), which in turn will index the work and pattern a predetermined amount so that a new portion of the work will be presented to the cutters on the next cutting stroke. The fluid escaping from the other end of cylinder 257 will pass through channel 259, feed-stop valve 254, channel 260, port 261 of the index valve, which is now connected to port 262, and then to the return line 236.

It will now be apparent that the downward movement of the cutters and tracer has been stopped, the indexing movement has been effected, and the carriers 45 and 70 are swinging inward toward the cutters and tracer.

Shortly after this inward movement starts, an elongated dog 263, Figure 20, mounted on the carrier 45 and moving toward the right as viewed in this figure actuates a trip lever 264 and thereby causes rotation of lever arm 266, Figure 22. This lever arm is connected by a long link 267 to a lever arm 268, Figure 3, keyed to the upper end of a vertical shaft 269. This shaft, as shown in Figure 11, has a short lever arm 270 secured thereto and sequentially engaging lugs 271 and 272 integral with detent plate 273. It will be noted that there is a certain amount of lost motion between the lever 270 and the lugs, whereby upon rotation of the lever arm in either direction, the spring pressed detent 274 will be caused to ride over the peak 275 formed in the detent plate and thereafter automatically complete the movement. This mechanism constitutes a load-and-fire mechanism for actuating the "in and out" valve similar to the one described for actuating the longitudinal control valve.

The detent plate 273 has a pin 276 which engages a notch formed in the end of the "in and out" plunger 163 automatically shifting the same. When the dog 263 actuates the trip lever 264 as just described, it causes rotation of the detent plate 273 in a clockwise direction as viewed in Figure 11, and thereby shifts the valve plunger 163 to the left as viewed in Figure 19.

In this new position of the valve plunger 163, the ports 165 and 162 are disconnected from one another, and the port 179 is interconnected with port 188. No result follows at the present time because the port 186 of the "longitudinal" valve to which the port 188 is connected by channel 187, is closed and therefore this becomes a dead line for the present.

During this movement of the tracer valve plunger, it will be apparent that the reservoir port 108 will gradually be closed so that the channel 193 through which the exhaust fluid from the large end of cylinder 61 is flowing to reservoir will be blocked and when the port 108 is completely closed, the inward movement of the tracer and cutters will be stopped. During this same time the port 112 is gradually being opened to thereby connect the pressure port 111 to channel 279. The channel 279 is connected to the left end of cylinder 245 whereby the pressure from pump 183 acts directly on the end of the contained plunger 280 and tends to shift the same toward the right. The movement is restrained by a flexible diaphragm 281. The movement, however, is sufficient to connect port 282 which, up to this time, has remained closed, with port 244.

The port 244 is connected at this time, as previously described, with the right hand end of cylinder 42 and since the other end of the cylinder is under pressure from pump 151, this connection permits the fluid from the right hand end of cylinder 42 to return to reservoir through channel 283 which results in an upward feeding movement of the tracer and cutters. It will be apparent that the rate of this movement will depend upon the amount that the port 282 is opened, which, in turn, will depend upon the amounts that the ports 111 and 112 are opened, which is dependent upon the position of the tracer valve plunger 103.

The maximum amount of opening of the last named ports will correspond to the central position of the tracer valve plunger 103, because movement to either side of this central position will cause a partial closing of either one or the other of ports 111 and 112 respectively, which will thereby interpose a resistance to flow and a consequent drop in pressure in channel 279. It will now be apparent that the tracer is capable of controlling the rate of the upward feeding movement, and that when the tracer moves from its central position in either direction it will decrease that rate of feeding movement. In addition it will cause an inward or an outward movement of the carriers 45 and 70, dependent upon whether the pressure port 110 is connected to channel 193 or whether the exhaust port 108 is connected thereto.

It will be noted that the ports 111 and 112 will cause a drop in pressure in the fluid flowing to channel 279, and thus they constitute a form of hydraulic resistance, with the result that the channel 279 constitutes a form of chamber having a resistance "in" and a resistance "out". If these resistances remain unchanged, a constant pressure will exist in the chamber. In other words, if the hydraulic resistance 284 were not provided, the pressure in channel 279 would eventually build up to the pressure in channel 190 regardless of the resistance of ports 111 and 112 and no control over the position of plunger 280 would be possible.

At the end of the upward cutting stroke a trip dog 285, shown in Figure 3, actuates the trip lever 218, and thereby shifts the interconnected valve plungers 168 and 202 to the right or in other words, into the position in which they are shown in Figure 19. This results in the interconnection of ports 186 and 185' so that the pump 183 can now deliver fluid coming through channel 187 to port 183' of cylinder 61, and since the pressure on the large end of piston 60 is now greater than the pressure on the small end, the carriers 45 and 70 will immediately start to move outward. The rate of this movement will be rapid because the rapid traverse pump 152 is interconnected at the same time by the annular groove 176 in plunger 168 to channel 178 which thereby increases the volume of flow acting on the large end of piston 60.

The shifting of plunger 168 to the right also disconnected the port 178 from port 237, so that channel 171 which leads from the right hand end of cylinder 42 and through which exhaust fluid was passing to reservoir during the cutting stroke, is now connected to a dead line 166 whereby upward movement of the tracer and cutters stops.

Shifting of the index valve plunger 202 to the right interconnected pressure port 251 to port 261 which thereby caused fluid to flow to the lower end of the index cylinder 257 resulting in a repositioning movement of the index mechanism preparatory to moving the pattern and work another small amount dependent upon the amount of material it is desired to remove on the next cutting stroke. The carriers continue their outward movement until a shoulder 286, Figure 21, formed on the dog 263, engages shoulder 287 formed on the member 288. This member is pivotally connected by a pin 289 to a rectangular portion 290 formed integral with the trip lever 264. This results in the shaft 265, which supports these parts, being rotated to cause shifting of the "in and out" valve plunger 168 to the right or into the position shown in Figure 19.

The effect of this is to stop the outward movement of the carriers by disconnecting port 188 from pressure 179 and also results in a rapid traverse downward movement of the tracer and cutters. The circuit is now conditioned to repeat the cycle just described and the repetitions will continue until the work piece or pieces have been finished.

In order that the work pieces may be readily removed, it is desirable that the carriers move further back from the tools than during the cutting operation. To this end on the last outward stroke of the carriers, the operator swings the member 288, Figures 20 and 21, by means of the handle 291 about the pivot 289 so as to remove the shoulder 287 from the path of the shoulder 286 on dog 263. These parts may thus pass one another, and the carrier will continue its outward movement until a second dog 292 attached to the carrier engages trip lever 293. To prevent interference, the dog 292 has an L-shaped projection 294 which extends to the other side of the T-slot plate 295 so as to be in the plane of the trip lever 293. This lever is supported for free rotation on a shaft 296 and has an arm 297 engaging the bifurcated end 298 of link 299. A spring 300 continuously urges the link and arm 297 in a counter-clockwise direction and a pin 301 is positioned to limit this movement.

As shown in Figures 3 and 26, the link 299 extends to a bracket 302 for operating a lever 303. The lower end of this lever is partially cut away to form a projecting lug 304. The end of the link 299 is flattened and a portion of it cut away to form a shoulder 305 which is adapted to engage the lug 304 and cause rotation of the lever 303 in a counter-clockwise direction. Upon actuation of the trip lever 293 by the trip dog in a clockwise direction, the link 299 moves toward the right and swings the lever 303 and its supporting shaft 306 to which it is keyed in a counter-clockwise direction. The lever 303 extends above the shaft 306, Figure 24, and is connected by means of a pin 307 to a second lever 308 supported for free rotation on the shaft 306 and the lower end of this lever is pivotally connected to the bifurcated end of link 309. This link is connected by a crank 310 to vertical shaft 311, which shaft, as shown in Figure 11, has integrally connected thereto a lever 312 which has a wide notch 313 cut in the end thereof. This notch is sufficiently wide to provide a lost motion connection with a pin 314 fixed in the detent plate 315.

This plate has two V-shaped notches 316 and 317 cut in the edge thereof but of different depth so that the intervening peak 318 is unequally spaced with respect to the bottom of the notches. The reason for this is that it is desirable that a small rotative movement be given to the parts in order to shift the stop valve to its stop position. Since this valve is also used for emergency stops by means of a manual control lever, it reduces the length of movement that must be given to the lever, and makes it possible for the operator to very quickly stop the machine in case of emergency. A spring pressed detent 319 is provided for automatically completing the movement whereby the mechanism acts as a load-and-fire mechanism.

The pin 314, which is integral with the plate 315, projects through the other side of the plate into a slot formed in the end of the stop valve plunger 146 for shifting the same. It will be noted that the lever arm 211 which is actuated by the hydraulically actuated stop plunger 147, is integral with the plate 315 and that the pin 320 mounted in the end of the lever 211 has a lost motion connection with the slot 321 formed in the end of plunger 147 whereby stop valve may be shifted to its stop position without interference from the hydraulically actuated stop plunger 147.

For manual operation, a hand lever 322 is secured to the shaft 306, and the lower end of this lever has a pair of spaced projecting lugs 323 and 324. These lugs are positioned to engage opposite sides of the lug 304 which projects from the lever 303. The wide spacing permits the link 299 to throw the lever 304 without interference from the lever 322. The shaft 306 extends the full length of the machine, as shown in Figure 2, and is provided with additional operating levers, such as the one, 304, shown in Figure 5, whereby the operator may stop the machine from any one of a number of stations about the machine. In other words, upon rotation of the shaft 306 by any of these stop levers, the lug 324 on the lever 322 will be moved into engagement with the lug 304 on the lever 303 and rotate the latter in a direction to cause shifting of the stop lever to its stop position. Upon rotation of the lever 322 in an opposite direction, the lug 323 will shift the lever 303 in an opposite direction and move the stop valve to a starting position. Thus the machine can be automatically stopped by the trip dog 292, but can be started only by manual actuation of the lever 303.

Indexing mechanism

As previously mentioned, a constant angle of indexing will not produce a uniform cross feed as measured along the surface of the work due to variations in the length of the radii of the various points on the periphery of non-circular bottles. This is obviously true because the opposite side of an angle increases in length with increases in length of the hypotenuse and in spite of the fact that the proportion between the side and the hypotenuse remains the same. Therefore, the longer the radius, the greater will be the length of the cross feed for the same angle of index. For practical reasons, in this machine it is desirable that the length of each indexing movement or cross feed as measured along the surface of the work be substantially uniform, which means that the opposite side of the angle must be kept uniform, and this can only be done by changing the size of the angle in accordance with changes in the length of the radius.

For purposes of explanation, an assumed standard length of cross feed may be arbitrarily chosen and by also choosing a standard length of radius, it can readily be determined through what angle the radius must be moved to produce the arbitrarily chosen length of feed. For convenience, this radius may be equal to the average of the longest and shortest radii which can be produced in the machine. For example, referring to Figure 23, let R equal the length of the longest radius, and $r$ the length of the shortest radius, then the length of the average radius $$R_a = \frac{R+r}{2}$$

In this figure, the line 326 may be assumed to represent the outline of the surface to be cut in a mold; the line 327 to represent the parting line of the mold; and the center 328 to represent the axis about which the mold is indexed. The assumed standard distance of index feed is represented by the numeral 329 as measured along the circle 330, and from this it will be apparent that the radius $R_a$, or in other words the mold, must be rotated through an angle indicated by the reference numeral 331 in order to effect this unit feed distance. If the outline of the mold was a true circle, as represented by the line 330, it is apparent that the angle 331 could remain the same throughout the entire machining operation and a uniform feeding movement would be effected at each indexing. In other words, an operating plunger could be geared to the work support and, taking into consideration the ratio of the connecting gearing, it could be very readily determined what the length of stroke of the plunger should be to effect this unit index angle.

For irregular shaped bottles, such as represented by the outline 326, this procedure will not apply because the angle of index must be varied in accordance with the length of the radius of the point of the surface being worked upon. This angle can be varied by varying the stroke of the plunger, and mechanism has been provided whereby this is automatically effected for each indexing movement. To this end, an outline control cam 332 is provided as shown in Figure 14, which is keyed to a shaft 333 anti-frictionally journaled in the carrier 45 and connected by bevel gearing 334, Figure 6, to a tubular shaft 335. This shaft is anti-frictionally journaled in the carrier 45 and carries a base plate 336 forming part of the swinging frame 127. The lower end of this shaft is connected by a worm gear 337 and a worm 338 to a shaft 339 which extends the full length of the machine and provided with similar worms for actuating worm gears connected to the individual operating shafts, which rotate the various work holders, as shown in Figure 3.

The shaft 339 has a gear couplet fixed thereto comprising the spur gears 340 and 341 which may be selectively interengaged by spur gears 342 and 343 respectively slidably mounted on a spline shaft 344. The shaft 344 is connected by change gears 345 and 346 to a second shaft 347 which is mounted in the carrier 45 in parallel relation with shaft 344.

Referring to Figure 15, these parts are actuated by a piston 258 which is slidably mounted in cylinder 257, previously referred to in the description of the hydraulic circuit shown on Figure 19. The piston rod 348, which is connected to the piston 258, has rack teeth 349 formed on one side which interengage with a pinion 350. The piston rod also has connected thereto a projecting lug 351 which is adapted to engage the periphery of a stop cam 352.

The pinion 350 is mounted for free rotation on shaft 347 which is journaled in the carrier frame. The pinion 350 has integrally formed therewith a ratchet wheel 353 which, as shown in Figure 12, will be rotated in a counter-clockwise direction upon downward movement of the plunger 348. A pawl carrying plate 354 is keyed to the shaft 347 in adjacent relation to the ratchet wheel and is provided with four pawls 355 which are pivotally attached to the plate and held into engagement with the ratchet teeth by means of spring pressed plungers 356. It will be noted that the teeth point in such a direction that upon counterclockwise rotation of the ratchet wheel, it will engage one of the pawls and cause rotation of the plate 354 and connected shaft 347 in the same direction, and that upon clockwise rotation, the ratchet teeth will ride under the pawls without causing rotation of the plate.

As shown in Figure 10, the plate 354 has integrally connected therewith a second ratchet wheel 357, the teeth of which point in an opposite direction to those on the ratchet wheel 353. A second pawl carrying plate 358 is mounted in adjacent relation to this last named ratchet wheel, but this plate is held against rotation by a pin 359, as more particularly shown in Figure 6. The result is that during the clockwise return motion of the ratchet wheel 353, the pawls 360 on plate 358 will engage the teeth on ratchet wheel 357 and prevent any return movement of shaft 347 during the upward or ratcheting movement of actuating plunger 348.

The gear couplet 342—343 is shifted on the spline shaft 344 by a shifter fork 361 which is slidably mounted on a supporting spline shaft 362. An operating shaft 363, which is actuated by the handle 364, shown in Figure 2, has an eccentric pin 365 on the end which engages a slot 366 formed in the shifter fork in such relation that the handle 364 may assume three different positions, in one of which the gear 343 is in mesh with the gear 341; in a second of which the gears are disengaged or in a neutral position; and in a third of which the gear 342 is in mesh with the gear 340.

The neutral position which has been provided makes it possible to rotate the shaft 339 manually to return the pattern and work holders to a starting position without interfering with the previously described ratchet mechanism. This manually operable means includes a sprocket wheel 367 which is keyed to the shaft 339. This sprocket wheel is connected by a chain 368, Figures 2 and 3, to a second sprocket wheel 369 fixed on shaft 370. This shaft is connected by bevel gearing 371 to a shaft 372, which projects from the carrier and is provided with an operating hand wheel 373. It will now be apparent that rotation of the hand wheel will cause rotation of shaft 339 and thereby rotary movement of the pattern and work carriers.

The mechanism shown in Figure 10 constitutes the connecting gearing previously referred to between the operating plunger 348 and the indexible supports. The length of the stroke of the plunger 348 is determined by the position of the stop cam 352 during the upward or ratcheting movement of the plunger. In other words, fluid is admitted to the lower end of the index cylinder 257 and the plunger moves upward until the lug 351 engages the periphery of the cam. The farther that the plunger is permitted to move up, the longer will be its actuating or indexing stroke when it moves down because the end of its downward movement is always the same, and is determined by the set screw 374 which, as shown in Figure 15, is in direct alignment with the end of the plunger 348.

It will be noted from Figure 6 that as the shaft 335 is indexed, it will effect a similar indexing movement of the control cam 352. The shape of this cam is to be considered merely as illustrative for one shape of bottle, it being understood that other cams having different shapes for producing other shapes of bottles may be substituted therefor. The shape of this cam is obtained by making the radii of each of the points around its effective operating periphery, proportional to the corresponding radii of the bottle, and also proportional with respect to the average radius previously referred to.

A follower in the form of a roller 375 is provided for engaging the periphery of this cam and the follower is attached to the end of a bell crank 376, which is pivotally mounted on a pin 377. A spring pressed plunger 378 engages a lug 379 projecting from one arm of the bell crank to continuously urge the follower into contact with the periphery of the cam 352. The arm 380 of the bell crank has a slot 381 formed longitudinally thereof in which is adjustably mounted a block 382 carrying a pin 383 forming a pivotal connection with a feed setting lever 384. The lever 384 is pivotally connected at 385 to the stop cam 352 and is movable therewith. The lever 384 carries a clamping bolt 386 which passes through a slot 387 which is circumferential with respect to center of pin 385, so that the arm 384 may be swung about this center and may be clamped in any one of several positions by the clamping bolt 386. The stop cam 352 is pivotally supported on the carrier for free swinging movement about the pin 388, and this movement is controlled by the bell crank 376 through its pivotal connection with the pin 383. It will be noted that the center about which the stop cam moves is in the axial plane of the plunger 348.

It was stated supra, that it could be readily determined what length of stroke the operating plunger should have to effect the unit index angle. Since this unit index angle was determined from the mean or average radius, and since this angle would have to be decreased for increases in the length of the radius; and increased for decreases in the length of the radius in order to keep the length of index stroke substantially constant, the length of stroke of the plunger necessary to produce the unit or mean index angle should be halfway between its minimum and maximum strokes. Therefore, if the radius 389 of the stop cam 352, which is 45° from the vertical radius 390 and from the horizontal radius 391, is made of a proper proportionate length to effect the mean index angle, then the periphery of the cam at one side of the radius 389 may be made of a constantly increasing radius, and the other half of a constantly decreasing radius, with the result that the stroke of the plunger is gradually shortened from the radius 389 to the radius 390 to effect decreases in the size of the index angle; and the stroke gradually increased from the radius 389 to the radius 391 to effect proportionate increases in the size of the index angle.

With this as a basic set-up, and the pin 383 adjusted to make the lever arm from this pin to the center of pin 377 equal to the arm with respect to the center of the pin 388, in other words, in a 1–1 ratio, it will be apparent that a uniform indexing movement of the arbitrarily assumed length will be automatically produced regardless of changes in the radii of control cam 352.

This arbitrarily assumed length will not, of course, be suitable for all occasions, especially where roughing and feeding operations are performed on the same machine, and therefore means have been provided for varying it by adjusting the feed control lever 384 relative to the stop cam 352, which thereby changes the ratio of the lever arms of the pin 383 relative to the fixed pins 377 and 388. This feed lever, however, effects minute changes in the amount of feed up to a certain limit, but this limit is not great enough, and that is why the change gears 345 and 346, shown in Figure 10, as well as the shiftable couplet 342—343 have been provided so that large steps of feed rate changes may be effected with this gearing and minute changes effected with the feed rate lever 384.

From an operating standpoint, it will be apparent that the mechanism shown in Figure 14 really constitutes a preselecting or predetermining mechanism whereby, during the downward actuating stroke of the plunger 348, the mechanism shown is actuated to preposition the stop cam 352 in accordance with changes in the radius of the profile cam 332 and thus predetermine the length of the next actuating stroke of the plunger 348.

The index stop valve 254, which is interposed in the channels between the index control valve 150 and the indexing cylinder 257, is mounted on the pattern carrier 45 as shown in Figures 2, 3, and 6. The details of this valve and the actuating mechanism therefor are shown in Figure 16. While this valve is in the position shown in Figure 19, it permits the index control valve 150 to control the reversible movement of piston 258 in the indexing cylinder 257. After the mold has been finished, and in order to insure that the indexing movement does not continue beyond predetermined safe limits which might thereby cause damage to the parts, a trip dog 392, as shown in Figure 6, is secured to the lower part of the swinging support 127 by means of a bolt 393 carried in the T-slot 394. This dog is adapted to trip a lever 395 which is secured to the upper end of shaft 396 shown in Fig. 16.

This shaft has a detent plate 397 secured thereto; and a pin 398 carried by the plate interengages a slot formed in the end of the valve plunger 399. The plate has a pair of V-shaped notches 400 and 401 formed in its periphery which form an intervening peak 402. A spring pressed detent 403 is pivotally supported on a pin 404 for engagement with the notches to hold the valve in either one of its two positions. It will be noted that the notches are of different depths whereby the peak 402 is much nearer to the notch 401 so that only a small angular movement in a counter-clockwise direction is necessary to cause firing of the valve plunger 399 to its stop position. Referring to Figure 19, when the valve plunger 399 is shifted to the left of the position shown, it closes channel 255, and also disconnects channel 259 from channel 260 whereby both ends of the cylinder 257 are sealed and the piston 258 disconnected from control by the index valve 150.

After the index stop valve has been trip operated in this manner it is necessary for the operator to return the supports by means of the manually operable hand lever 373, before the valve 399 can be thrown into its index position again.

In the bottle making industry, there are some molds, each of which has a plurality of cavities formed therein because the particular bottles are so small that a number of them are cast in one mold. It is desirable that each of these cavities be produced by the same method, and that is with each cavity centralized with respect to the pivot or axis of rotation of the work and pattern supports. These supports are therefore constructed so that the frame member 125 may be shifted in a tangential direction relative to the circle or arcuate path through which the frame moves. In connection with the description of Figure 6, it was stated that the frame 125 was mounted for sliding movement on the guideway 126. On the supporting plate 336 is secured a block 405 upon which the guideway 126 is formed. This block has a circular bore 406, Figure 7, in which a drum 407 is supported for rotation and the upper end of this block is cut away to permit a spring pressed pin 408 to move with the frame 125 and still project into engagement with any one of a series of slots 409 cut in the periphery of the member 407. The slots 409 are spaced different distances in axial direction from the center slot or groove 410 and this spacing may be made to correspond to the spacing of the cavities in different multiple mold blocks. It should be obvious that the spacing of the notches to one side of the center groove 410 should be similar to those on the other side because the cavities in the mold blocks will be symmetrical with respect to the center of the block. Adjustment is effected by rotating the member 407 by means of a wrench applied to the squared end 411; and a graduated dial 412 also secured to the end of the member 407 cooperating with a pointer 413 indicates the particular notch that is located on top for cooperation with the plunger 408. In order to maintain the member 407 in any one of its rotative positions, a spring pressed plunger 414 is reciprocally mounted in the base of the structure, and it has a bevelled end 415 adapted to engage notches 416 formed in a detent wheel carried by the member 407. In operation the plunger 408 is retracted by rotating a shaft 417 which is more particularly shown in Figure 18. As shown in Figure 7, the end of this shaft has a lug which projects into a slot cut in the side of member 408 so that upon rotation of shaft 417 in counterclockwise direction the member 408 will be withdrawn. The end of member 417 has a square or hexagon shaped end 419, and a wrench 420, having a similar shaped socket formed in the end thereof, is inserted in the bore 421 which contains the shaft 417 for withdrawing the plunger. While the plunger is held withdrawn, an operating handle 422 pivotally mounted at 423 on the front of the base plate 336 is rotated and the end of this lever is bifurcated to engage a lug 424 depending from the frame 124 to cause the same to slide along the guideway 126. When the frame is in the proper position, the wrench 420 is released and the spring 425 returns the plunger 408 into the proper locating notch. It will therefore be seen that with a mold block having a plurality of cavities therein that the same may be positioned axially of the index bar 407 so as to progressively align the cavities in a central relation with respect to the axis of the pivot 129.

It is well known that it is highly impractical to build a spindle construction which is efficient at low speeds and also at extremely high speeds. Therefore, to make it possible to have low spindle speeds for roughing work, and also high spindle speeds for finishing and cutting the fine intricate designs that are provided on bottles, each cutter carrier, as shown in Figure 29, is provided with a pair of guideways, one of which, 426, is a V-shaped guide, and the other, 427, a flat guide, and a high speed and a low speed spindle unit are provided for selective mounting on these guides. A pair of clamping members 428 are pivotally supported by pins 429 on the spindle unit and a certain amount of lost motion between the pins and clamping members are provided to permit vertical adjustment. The lower end of the 430 which grip the under surface of the guide portions and by means of clamping nuts 431, threaded on the upper end of the clamping members, the lower end of the clamping members are caused to pivot inwardly to insure gripping the carrier and when the nuts are tightened the spindle unit is drawn tightly into engagement with the guide surfaces.

In addition, to prevent longitudinal movement of the spindle units, or in other words, to absorb the end thrust on the cutters, the spindle unit is provided with a depending lug 432, as shown in Figure 28, which is adapted to be gripped on opposite sides by a pair of clamping blocks 433 and 434. The block, such as 433, is threaded on a screw 435 rotatably mounted in the carrier and held against axial movement by a set screw 436. The other block 434 is threaded on a screw 437, which passes through an opening formed in the lug 432, as more particularly shown in Figure 29, for shifting the block 434, and still be accessible from the front of the machine, whereby the operator may adjust both of these screws from the same position.

It will be noted from Figure 5 that the high speed spindle unit 63 is provided with a small pulley 66' which was connected to the larger pulley on the pulley cone 69. When the low speed spindle unit, such as shown in Figure 28, is mounted in the machine the pulley 438 secured to the end of the spindle 439 will align with the smaller pulley on the cone 69, whereby the spindle will be driven at slower speeds.

Attention is invited to the fact that the elongated dog 263, Figure 20, serves as an interlock to prevent manual actuation of the lever 291 when the work and pattern supports are in engagement with the work and cutter. This is to insure that the work and pattern are sufficiently separated from the tracer and tools before the same are traversed at a rapid traverse rate.

The operation of one cycle of the machine will now be described, and assuming for a starting position that the pattern and work carriers are in an extreme outward or loading position and that the tracer and cutter carriers are in an up position, because this would normally be the position of the parts when the machine is stopped in a loading position. In other words, at the end of the last tracing stroke, the operator would hold the lever 291 outward so that the trip dog 263 would pass the same without tripping thereby allowing the carriers to return to an extreme outward or loading position. After this dog has passed the lever, the operator releases the lever, whereupon the dog 292 actuates the stop lever 293 to shift the stop valve plunger 146 to the right, as viewed in Figure 19, and then the front face of the dog will engage the shoulder 287 on the trip lever 291 and shift the valve 163 into the position in which it is shown in Figure 19. Therefore, all the valves shown in Figure 19 would be in the position shown in Figure 19, with the exception that the stop lever would be in a position to close port 158 thereby preventing downward movement of the cutter and tracer carriers.

After the operator has loaded the fixtures with new work pieces, he rotates the hand wheel 373 shown in Figure 3 to rotate the work and pattern frames to one extreme position, so that the first tracing stroke will be at one end of the semi-circular face to be reproduced.

The stop lever 304 is now thrown to shift the stop valve plunger 146 into a running position whereby the port 158, which is connected to one end of cylinder 42, is interconnected with the other end of cylinder 42, but due to the piston differential, the same pressure acting on both ends of the piston will cause the piston to move in a direction to cause downward movement of the tracer and cutter carriers. This movement will continue until the dog 216, shown in Figure 3, actuates the trip lever 216, resulting in the shifting of valve 163 to the left. This will result in port 185' of this valve being connected to port 186 whereby the large end of piston 60 will be connected to reservoir through throttle valve 166, channel 192, and interconnected ports 166 and 189 of the tracer valve, the port 166 being a reservoir port. These ports will be interconnected due to the fact that the tracer is undeflected. Since constant pressure is acting on the other end of piston 60, the pattern and work carriers will move in at a rapid rate. Immediately after this movement starts, the lug 264 on lever 291, as shown in Figures 20 and 21, will be engaged by the dog 263 thereby rotating the lever 291 in a counterclockwise direction resulting in a shifting of plunger 163 to its left position. This will close port 162 and stop the downward movement of the tracer and cutter carriers.

The work and pattern carriers will move inward until the pattern contacts the tracer and shifts the tracer a sufficient distance to partially close port 166 a sufficient amount and open port 110 to raise the pressure in annular groove 113 and thereby raise the pressure in the large end of cylinder 61. When the unit pressure in the large end is equal to one half the unit pressure in the small end, the inward movement will stop. Shifting of the tracer plunger 78 also uncovered port 112 admitting fluid from the pressure port 111 to channel 279 which will cause a shifting of valve 268 a sufficient amount to uncover the reservoir port 282 and thereby admit fluid from the right hand end of cylinder 42 through channel 171 and interconnected ports 178 and 237 to reservoir. Since the constant pressure from pump 151 is acting in the other end of cylinder 42, the cutter and tracer carriers will move upward on a tracing stroke under the control of the tracer, which will also simultaneously control the in and out movement in accordance with variations in the pattern.

At the end of the tracing stroke, dog 285 mounted on the tracer carrier will trip the lever 218 and thereby shift plunger 168 to the right and thereby interconnect ports 185' and 186, the latter being connected to the pump 183 whereby the same unit pressure will exist in both ends of cylinder 61, and the piston 60 will therefore move in a direction to retract the work and pattern from the cutters and tracer. On this outward movement, the dog 263 will trip lever 291 and immediately shift the valve 163 to the right whereby a repetition of the cycle will be initiated. This cycle will be repeated as many times as is necessary and automatically until the work has been reproduced and at the end of each cutting stroke the index plunger will be operated to turn the work the desired amount.

There has thus been provided an improved automatic multiple bottle mold milling or engraving machine which is pattern controlled, and which will automatically repeat a cycle of operation without attention on the part of the operator, and which will automatically effect an indexing movement between the cutter and work, once for each cycle. As previously pointed out, the machine is also provided with certain interlocks to insure maximum safety in the operation of the machine. Also the machine is capable of performing roughing operations and high speed finishing operations with equal efficiency.

That which is claimed is:

1. In a pattern controlled machine tool, the combination of a cutter support, a tracer support, a tracer carried by the tracer support and having a tracing point, said tracer support being pivotally mounted to move the tracing point through an arc, a pivotal mounting for the cutter support, a pattern support and a work support operatively connected for joint movement with respect to the tracer support and cutter supports, power operable means for moving said supports, and means controlled by the tracer for automatically causing oscillation of the pattern support in a manner to maintain the surface of the pattern tangent to the arc of travel of the tracer point and in contact therewith.

2. In a pattern controlled machine tool the combination of oscillating supporting means for a work piece and a pattern, a second oscillating supporting means for a cutter and tracer, means to impart an arcuate feeding stroke to the point of the tracer and cutter, and means to oscillate the other supporting means in accordance with the contour of the pattern to cause reproduction thereof in the work, said last named means including a direction control mechanism governed by the tracer.

3. In a pattern controlled machine tool, a bed having parallel supporting shafts mounted thereon, a cutter carrier and a tracer carrier mounted on one of said shafts, a work carrier and a pattern carrier mounted on the other of said shafts, a pair of operating shafts having link connections to the free end of said carriers, motors connected to said operating shafts, and means controlled by the tracer during contact with a pattern for governing actuation of said motors.

4. In a pattern controlled machine tool, the combination of a bed, a column uprising from said bed, a tracer supporting unit pivotally mounted on the face of said column, a pattern carrier oscillatably mounted on said bed for swinging movement toward and from said column, a second column uprising from said bed, a cutter supporting unit pivotally mounted on the face of the second column, a work supporting unit pivotally mounted upon the bed for swinging movement toward and from said second column, a first piston and cylinder operatively connected for simultaneously swinging the carriers mounted on the columns, a second piston and cylinder operatively connected for swinging the work and pattern carriers, and an hydraulic control circuit including a valve controlled by the tracer for governing relative movement between the carriers in a manner to effect reproduction of the pattern by the cutter on the work piece.

5. In a pattern controlled machine tool, an elongated bed, a series of vertical columns upstanding from the bed, a tracer supporting unit pivotally mounted on one of said columns, a cutter supporting unit pivotally mounted on each of the remaining columns, means connecting all of said units together for simultaneous swinging movement, a pattern carrier pivotally supported on the bed for swinging movement toward and from the tracer unit, a plurality of work carriers pivotally supported on the bed for swinging movement toward and from the cutter units respectively, a first hydraulic motor pivotally supported on one of said columns for actuating said tracer and cutter units, a second hydraulic actuating circuit including a tracer controlled valve for governing individual or simultaneous operation of said motors.

6. In a pattern controlled machine tool, the combination of a tool support pivotally mounted for movement above and below a horizontal plane, a tool spindle journaled thereon, a work support pivotally mounted for swinging movement to opposite sides of a vertical plane, a prime mover mounted on the tool support and below the pivotal axis thereof, whereby it will tend to counter-balance the horizontally extending spindle, motion transmitting means coupling the prime mover to the spindle for rotation thereof, and operating members connected to said supports at points lying in spaced relation to the pivotal axes thereof, whereby a relatively small actuating force can be utilized for moving each support.

7. In a pattern controlled machine tool the combination with a bed or support, of a plurality of pairs of swinging carriers mounted on said bed, one member of each pair having means for supporting a work piece, and the other member, having a tool spindle journaled thereon, power operable means for rotating said spindles, an additional pair of swinging carriers, one of which carries a pattern, and the other a tracer; and power operable means operatively connected to one member of all of said pairs of carriers, and controlled by the tracer while in contact with the pattern for governing relative movement between the members of the pairs of carriers.

8. In a pattern controlled machine tool, the combination of a plurality of work supports mounted for oscillatory movement about a fixed axis, a plurality of cutter supports mounted for oscillatory movement about a second fixed axis, a first oscillatory shaft for swinging one set of carriers, a second oscillatory shaft for swinging the other set of carriers, a fixed support for said shafts, and means for oscillating said shafts, including pistons and cylinders, cranks connecting said pistons to the respective shafts, and means to pivotally support said cylinders on said fixed support for oscillatory movement.

9. In a pattern controlled machine tool, the combination of a first carrier supported for oscillatory movement about a fixed axis, a tool spindle supported for oscillatory movement about a second fixed axis and parallel to the first, the axis of said tool spindle lying perpendicular to the fixed axis, a work support mounted on the first carrier and indexible about an axis perpendicular to the oscillatory axis of the carrier, tracer controlled means for governing relative movement between the carriers, and power operable means carried by one carrier for effecting indexing of said work support.

10. In a pattern controlled machine tool having a pair of carriers supported for oscillatory movement relative to intersecting planes, the combination of a power driven metal cutting tool mounted on one carrier and a work support rotatably mounted on the other carrier for movement about an axis perpendicular to the axis of the carrier; tracer controlled means for determining the cutting path to be generated by relative movement between the carriers, one of said carriers being continuously moved in one direction during the cutting operation, and means to index the work support at the end of a cutting stroke, including a fluid operable piston.

11. In a pattern controlled machine tool having a work carrier and a tool carrier, of power operable means for effecting relative movement between the carriers to determine the cutting path; a pattern and tracer interengagable for determining the direction of said path; an inflexible work support; and power operable means for indexing said support after each cutting stroke, including a fluid operable piston, positive means for limiting the movement of said piston in either direction, means operatively coupling said piston to the work support, and means for adjusting one of said positive stops to vary the length of said indexing movement.

12. In a pattern controlled machine tool having a cutter support and a work support, the combination with power operable means for effecting relative movement between the supports, of a tracer and pattern for governing said relative movement whereby the pattern is reproduced in the work; means operable at the end of each cutting stroke to effect indexing of the work relative to the cutter, including a fluid operable piston operatively connected to the work support, positive means for limiting the movement of said piston in each direction, one of said means including a stop cam, and means to adjust said cam to vary the stroke of said piston, and thereby the length of said indexing movement.

13. In a pattern controlled machine tool for reproducing quasi-concave semi-cylindrical patterns, means for supporting work blanks for movement about two axes angularly related to one another, whereby during movement of a cutting tool in one plane, the blank may be oscillated relative to the cutter under the control of a tracer in engagement with a pattern, and may be indexed about the other axis at the end of each cutting stroke, power operable means for effecting said indexing, including a power reciprocable member, positive stops for limiting the movement of said member, one of said stops including a cam having a uniformly varying radius, and means to automatically position said cam to determine the length of the next indexing movement.

14. In a machine tool having a work support mounted for oscillatory movement, means to support a work piece on said carrier for indexing about an axis perpendicular to the axis of oscillation, a cutter for operating upon the face of the work, the axis of said cutter continuously intersecting the index axis of the work, means to continuously change the angle between said index axis and cutter axis during a cutting stroke, and means to index the work after each cutting stroke.

15. In a pattern controlled machine tool, the combination of a tool and tracer, power operable means for moving the point of the tool and the tracer through arcuate paths, means to support a work piece and a pattern in operative relation to the tool and tracer respectively, and means controlled by the tracer for maintaining the work and pattern progressively tangent to the respective paths and at the points of intersection of said paths with the axes of the tool and tracer.

16. In a machine tool having a work holder pivotally supported for movement about an axis lying parallel to the general longitudinal axis of the work, means to support a cutting tool with its axis intersecting the first named axis, power operable means for effecting a relative feeding movement between the tool and the work while maintaining the tool in the plane determined by said intersecting axes, means to index the work about said first named axis, and means to increase the amount of the indexing movement as the radius of the work grows smaller, or to decrease the amount of indexing movement as the radius of the work grows larger.

17. In a machine tool for finishing the interior of a concave surface, the combination with a cutting tool, of power operable means for feeding the tool parallel to the longitudinal axis of said surface, means effective after each feeding stroke to effect an indexing movement of the work, including a control cam, the radii of points on the periphery of which are proportional to the radii of the points to be produced in the desired surface of the work, a power operable member for effecting indexing of the work, and means controlled by said cam for determining the length of each indexing movement.

18. In a machine tool, the combination of a work holder supported for movement about a predetermined axis, a cutting tool, means for effecting a feeding movement between the cutting tool and the work holder in a plane containing said axis, means for indexing the work about said axis after each feeding stroke of the tool, including a power operable member, motion transmitting connections from said member to the work holder, a control cam having a profile similar to the desired profile to be formed on the work, an adjustable stop for limiting the stroke of said member, and motion transmitting connections from said profile cam for adjusting said stop whereby the length of the indexing movement as measured along the surface of the work will be substantially uniform regardless of the radius thereof with respect to the axis of said work holder.

19. In a machine tool having a work holder supported for movement about a predetermined axis, and a cutting tool arranged with its axis intersecting the first named axis, of power operable means for feeding the tool in the plane of the first named axis, means to index the work about said first named axis after each cutting stroke of the tool, including a power operable member, motion transmitting means, including rate-change gearing, coupling the member for operation of said work holder, and stop means for limiting the movement of said member, one of said stop means being adjustable to effect minute variations in the amount of said indexing movement.

20. In a work support having an index axis, the combination of power operable means for indexing said support, including a power reciprocable member, motion transmitting connections from said member to said support, an adjustable stop cam for limiting the stroke of said member, a control cam simultaneously operable with said work support for predetermining the length of the next stroke of said member, a follower for said cam, and motion transmitting connections between said follower and said stop cam, including rate-change means.

21. In a pattern controlled machine tool having cutter and tracer supports, and work and pattern supports, the combination with a pair of fluid operable motors, one of which is connected for effecting a relative uni-directional feeding movement between one group of supports as respects the other, and the other motor for effecting a reversible movement between the groups of supports in a direction normal to said feeding movement, of a tracer control circuit, a first valve for coupling the tracer control circuit to said motors for automatic contouring operations; individual pumps for supplying said motors, a second control valve, means trip operable by one of the moving supports during the feeding stroke for shifting said first named control valve into a position coupling the motors to said second control valve, and means in said second named control valve for stopping one of said motors and connecting the delivery of said two pumps to the other motor for effecting a rapid return movement thereof.

22. In a pattern controlled machine tool having cutter and tracer supports and work and pattern supports, the combination with a pair of fluid operable motors, one of which is connected for effecting a relative uni-directional feeding movement between the first pair of supports and the second pair of supports, and the other for effecting a reversible movement between the supports in a direction normal to said feeding movement, of a tracer control circuit, a first valve for coupling the tracer control circuit to said motors for effecting an automatic contouring operation; individual pumps for supplying said motors, a second control valve, means trip operable by one of the moving supports during the feeding stroke for shifting said first named control valve into a position coupling the motors to said second control valve, a rapid traverse pump connected to said second named control valve, and means in said valve for stopping one motor and connecting the output of all three pumps to the other motor to cause rapid return movement between the pairs of supports.

23. In a pattern controlled machine tool having a first pair of relatively movable cutter and work supports, and a second pair of relatively movable pattern and tracer supports; of a tracer control circuit having a pair of channels connected thereto, means in the tracer control circuit for controlling the rate of uni-directional flow in one channel, and for determining reversible flow in the other channel, a pair of fluid operable pistons operatively connected for effecting the respective relative movements between the pairs of supports, said pistons having differential areas, individual pumps constantly connected to the small ends of said pistons, a valve connecting the other ends of said pistons to said channels for effecting an automatic contouring operation, and a double tapered throttle valve for simultaneously adjusting the rate of flow in each of said channels to vary the rate of said contouring operation.

24. In a pattern controlled machine tool having a work support and a pattern support movable toward and from a cutter support and a tracer support respectively, of a differential piston operatively connected for effecting a feeding movement between said supports, a second differential piston operatively connected for causing movement of said pattern and work supports toward and from the cutter and tracer supports, individual pumps for supplying said pistons, channels connecting said pumps to the small end of the respective pistons, a tracer control circuit for controlling uni-directional flow from the large end of one piston and reversible flow to the large end of the other piston, whereby a contouring operation may be automatically effected, and a stop valve interposed in the channel connections between one of said pumps and the piston connected thereto.

25. In a pattern controlled machine tool having a work support and a pattern support, movable toward and from a cutter support and a tracer support respectively, of a differential piston operatively connected for effecting a feeding movement between said supports, a second differential piston operatively connected for causing a relative movement of said pattern and work supports toward and from the cutter and tracer supports, individual pumps for said pistons, channels connecting said pumps to the small end of the respective pistons, a tracer control circuit for controlling the uni-directional flow from the large end of one piston and reversible flow to the large end of the other piston, whereby a contouring operation may be automatically effected, a stop valve interposed in the channel connections between one of said pumps and the feeding piston, and means for operating said stop valve, including a manual control shaft operable from a plurality of stations about the machine.

26. In a pattern controlled machine tool having a work support and a pattern support movable toward and from a cutter support and a tracer support respectively, of a differential piston operatively connected for effecting a feeding movement between said supports, a second differential piston operatively connected for causing approach and retractive movements between said supports, individual pumps for said pistons, channels connecting said pumps to the small ends of the respective pistons, a tracer control circuit for controlling the uni-directional flow from the large end of one piston, and reversible flow to the large end of the other piston, whereby a contouring operation may be automatically effected, a stop valve interposed in the channel connections between one of said pumps and the small end of the feeding piston, valve means shiftable at the end of a feeding stroke into a position coupling the output of all the said pumps to the large end of the feeding piston to effect a rapid return movement of the cutter and tracer to a starting position, and interlock means between the tracer and stop valve for automatically actuating the latter to a stop position upon inadvertent deflection of the tracer.

27. In a pattern controlled machine tool having a work support and a pattern support movable toward and from a cutter support and a tracer support respectively, of a differential piston operatively connected for effecting a feeding movement between said supports, a second differential piston operatively connected for causing movement of said pattern and work supports toward and from the cutter and tracer supports, individual pumps for said pistons, channels connecting said pumps to the small ends of the respective pistons, a tracer control circuit for controlling the uni-directional flow from the large end of one piston and reversible flow to the large end of the other piston whereby a contouring operation may be automatically effected, a stop valve interposed in the channel connections between one of said pumps and the small end of the feeding piston, valve means shiftable at the end of a feeding stroke into a position coupling the output of all the said pumps to the large end of the feeding piston to effect a rapid return movement of the cutter and tracer to a starting position; interlock means between the tracer and stop valve for automatically shifting the latter to a stop position upon inadvertent deflection of the tracer, said last named means including a fluid operable plunger operatively connected to the stop valve, and channel connections effected by said valve means for coupling said plunger for actuation upon deflection of the tracer.

28. In a pattern controlled machine tool having a first pair of relatively movable supports, one of which is adapted to carry a pattern and the other a tracer, and a second pair of relatively movable supports, one of which is adapted to carry a work piece and the other a cutter, of power operable means for effecting relative movement between said pairs of supports along an undulatory path as determined by the tracer, trip operable valve means for sequentially causing separation between the pairs of supports and rapid return movement of the tracer and cutter supports to a starting position, means to effect a relative indexing movement between the supports, including a fluid operable plunger; and a control valve therefor simultaneously operable with said valve means.

29. In a pattern controlled machine tool having a cutter and a tracer, the combination of a pair of movable carriers mounted in opposed relation to the cutter and tracer respectively, a work support and a pattern support mounted on said carriers for oscillatory movement relative to said carrier, means to effect a relative feeding movement between the cutter and work support, and between tracer and pattern in a plane coincident with the axis of oscillation of said supports, fluid operable means for indexing said supports about their respective axes, including an automatically operable reversing valve, an oscillatory start and stop control valve interposed between said reversing valve and said fluid operable means, and trip means carried by the support for actuating the said start and stop valve.

30. In a pattern controlled machine tool having movable tracer and cutter supporting means, and movable work and pattern supporting means; the combination of a hydraulic control circuit, including separate fluid operable motors for actuating each of said means, a tracer control valve for governing the operation of said motors during a profiling operation, a pair of control valves, one of which is shiftable to stop the profiling operation and cause retraction of the work and pattern supporting means, and the other of which is shiftable to cause a rapid return movement of the cutter and work supporting means; and an interlock carried by the work and pattern supporting means to prevent actuation of the last named valve until sufficient separation has been effected between the pattern and tracer to permit the return movement without interference therebetween.

31. In an automatic contouring machine having a pattern and work support relatively movable with respect to a tracer and cutter support, of a power operable control circuit for effecting a repetitive cycle of operation including a cutting stroke and subsequent separation of the work and pattern from the cutter and tracer; means trip operable by the retracting means for initiating a return movement of the cutter and tracer to a starting position, including a trip lever and a dog, means to withdraw one from the path of the other whereby said retracting movement will continue, and additional means subsequently trip operated by the retracting support for stopping the machine.

32. In an automatic contouring machine having a pattern and work support relatively movable with respect to a tracer and cutter support, of a power operable control circuit for effecting a repetitive cycle of operation including a cutting stroke and subsequent separation of the work and pattern from the cutter and tracer, means trip operable by the retracting means for initiating a return movement of the cutter and tracer to a starting position, including a trip lever and a dog, means to withdraw one from the path of the other whereby said retracting movement will continue, additional means subsequently trip operated by the retracting support for stopping the machine, and a manually operable lever having a lost motion connection with said last named means for starting the machine while said trip operable means are still in engagement.

33. In a pattern controlled machine tool having a cutter and a tracer, the combination of a pair of movable carriers mounted in opposed relation to the cutter and tracer respectively, a work support and a pattern support mounted on said carriers for oscillatory movement relative to said carriers, means to effect a relative feeding movement between the cutter and work support, and between the tracer and pattern support in a plane coincident with the axes of oscillation of said supports, fluid operable means for indexing said supports about their respective axes, including an automatically operable reversing valve, a start and stop control valve interposed between said reversing valve and said fluid operable means, trip means carried by the support for shifting the last named control valve to a stop position, and manually operable means for repositioning said valve in a running position.

34. In a pattern controlled machine tool the combination of oscillatory work and pattern supports movable about axes which intersect the axes of the tracer and cutter of the machine during a contouring operation, means to index the supports about said axes to successively present new portions of the work to the cutter, guideways formed on said oscillatory supports, work and pattern supports slidably mounted on said guideways, and means to shift said supports to present a new die in the work to the cutter whereby a multiple die block may be machined in one set-up.

35. In a pattern controlled machine tool having oscillatory supporting means for a pattern and work and for a cutter and tracer, the combination of means for supporting the cutter and tracer with their axes in intersecting relation to the axis of oscillation of said supporting means whereby all portions of the arcuate cavity in the work piece may be successively presented to the cutting means, and means to shift the work laterally of the plane determined by said intersecting axes to position the longitudinal axis of another arcuate cavity in the work in said plane.

36. In a pattern controlled machine tool having a cutter and tracer, and an oscillatory work support mounted in the machine with its axis of oscillation in intersecting relation to the axis of the cutter, whereby an arcuate cavity in the work may be successively presented to the cutter, a work holder slidably mounted on the support, and means to shift said work holder to align the longitudinal axis of another arcuate cavity in the work in said plane for presentation to the cutter.

37. In a pattern controlled machine tool having a cutter and tracer, and oscillatory pattern and work supports, the combination of means for supporting a multiple die block pattern on the pattern support, including an oscillatory table, an oscillatory table for a work piece, guideways formed on each of said supports and arranged in tangential relation to a circle about the axis of oscillation, a work holder and a pattern holder mounted on said guideways, and means to position said holders, including a rotatable drum having a series of notches formed therein in various spaced relation, and a locking plunger carried by the supports for cooperating with said notches to lock the holders in various positions.

38. In a pattern controlled machine tool having a cutter and tracer, and oscillatory pattern and work supports, the combination of means for supporting a multiple die block pattern for reproduction, including an oscillatory support for a pattern, an oscillatory support for a work piece, guideways formed on each of said supports and arranged in tangential relation to a circle about the axis of oscillation, a work holder and a pattern holder mounted on said guideways, means to position said holders, including a rotatable drum having a series of notches formed therein in variably spaced relation, a locking plunger carried by the supports for cooperating with said notches to lock the holders in various positions, and detent means for holding the drum in various positions.

39. A pattern controlled machine tool for roughing and finishing dies, including a movable supporting means having pattern and work holders thereon, an additional movable supporting means having a tracer for cooperation with the pattern, a guideway formed on said last named supporting means, interchangeable low speed and high speed spindle units selectively mountable on said guideways, means to clamp the selected unit in position on said guideways, a prime mover carried by said supporting means, said prime mover having a large and small pulley attached thereto for actuation thereby, and means to couple the large pulley to the high speed spindle unit for roughing operations, or the small pulley to the low speed spindle unit for finishing operations.

ERWIN G. ROEHM.

CERTIFICATE OF CORRECTION.

Patent No. 2,111,332.    March 15, 1938.

ERWIN G. ROEHM.

It is hereby certified that error appears in the printed specification of the above numbered patent requiring correction as follows: Page 10, second column, after line 68, insert the words clamping members have laterally extending lugs; and that the said Letters Patent should be read with this correction therein that the same may conform to the record of the case in the Patent Office.

Signed and sealed this 26th day of April, A. D. 1938.

(Seal)

Henry Van Arsdale,
Acting Commissioner of Patents.

notches to lock the holders in various positions.

38. In a pattern controlled machine tool having a cutter and tracer, and oscillatory pattern and work supports, the combination of means for supporting a multiple die block pattern for reproduction, including an oscillatory support for a pattern, an oscillatory support for a work piece, guideways formed on each of said supports and arranged in tangential relation to a circle about the axis of oscillation, a work holder and a pattern holder mounted on said guideways, means to position said holders, including a rotatable drum having a series of notches formed therein in variably spaced relation, a locking plunger carried by the supports for cooperating with said notches to lock the holders in various positions, and detent means for holding the drum in various positions.

39. A pattern controlled machine tool for roughing and finishing dies, including a movable supporting means having pattern and work holders thereon, an additional movable supporting means having a tracer for cooperation with the pattern, a guideway formed on said last named supporting means, interchangeable low speed and high speed spindle units selectively mountable on said guideways, means to clamp the selected unit in position on said guideways, a prime mover carried by said supporting means, said prime mover having a large and small pulley attached thereto for actuation thereby, and means to couple the large pulley to the high speed spindle unit for roughing operations, or the small pulley to the low speed spindle unit for finishing operations.

ERWIN G. ROEHM.

CERTIFICATE OF CORRECTION.

Patent No. 2,111,332. March 15, 1938.

ERWIN G. ROEHM.

It is hereby certified that error appears in the printed specification of the above numbered patent requiring correction as follows: Page 10, second column, after line 68, insert the words clamping members have laterally extending lugs; and that the said Letters Patent should be read with this correction therein that the same may conform to the record of the case in the Patent Office.

Signed and sealed this 26th day of April, A. D. 1938.

(Seal)

Henry Van Arsdale,
Acting Commissioner of Patents.

CERTIFICATE OF CORRECTION.

Patent No. 2,111,332. March 15, 1938.

ERWIN G. ROEHM

It is hereby certified that error appears in the printed specification of the above numbered patent requiring correction as follows: Page 10, second column, after line 68, insert the words clamping members have laterally extending lugs; and that the said Letters Patent should be read with this correction therein that the same may conform to the record of the case in the Patent Office.

Signed and sealed this 26th day of April, A. D. 1938.

(Seal)

Henry Van Arsdale,
Acting Commissioner of Patents.